US 8,373,878 B2

(12) United States Patent
Kato

(10) Patent No.: US 8,373,878 B2
(45) Date of Patent: Feb. 12, 2013

(54) COOPERATIVE JOB FLOW CREATING APPARATUS, COOPERATIVE JOB FLOW CREATING METHOD, SERVICE PROCESSING APPARATUS, SERVICE PROCESSING METHOD, MANAGEMENT SERVER, FLOW CONVERSION METHOD, JOB FLOW EXECUTION METHOD, PROGRAM, AND STORAGE MEDIUM

(75) Inventor: Yutaka Kato, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1094 days.

(21) Appl. No.: 11/996,486

(22) PCT Filed: Sep. 28, 2006

(86) PCT No.: PCT/JP2006/319910
§ 371 (c)(1),
(2), (4) Date: Jan. 22, 2008

(87) PCT Pub. No.: WO2007/043420
PCT Pub. Date: Apr. 19, 2007

(65) Prior Publication Data
US 2009/0122333 A1 May 14, 2009

(30) Foreign Application Priority Data

Oct. 13, 2005 (JP) .................................. 2005-298478
May 17, 2006 (JP) .................................. 2006-137528

(51) Int. Cl.
*G06F 3/12* (2006.01)
(52) U.S. Cl. ...................... 358/1.15; 358/1.1; 358/1.13
(58) Field of Classification Search ................ 358/1.1, 358/1.9, 1.13, 1.15; 709/219, 220, 221, 223, 709/224; 710/1, 8
See application file for complete search history.

(56) References Cited

U.S. PATENT DOCUMENTS 7,551,303 B2 * 6/2009 Hikawa et al. ............... 358/1.15
2005/0027825 A1 2/2005 Hikawa
(Continued)

FOREIGN PATENT DOCUMENTS

EP 1 457 890 9/2004
JP 10083263 3/1998
(Continued)

OTHER PUBLICATIONS

International Preliminary Report on Patentability in PCT/JP2006/319910.

(Continued)

*Primary Examiner* — Thomas D Lee
(74) *Attorney, Agent, or Firm* — Fitzpatrick, Cella, Harper & Scinto

(57) ABSTRACT

To create a job flow having machine type dependence and commonly usable among different types of devices, a CPU of a client PC displays first task information relating to tasks usable in a first print processing device and creates a first task cooperative job flow executable in the first print processing device. Then, the CPU of the client PC creates definition information of the first task cooperative job flow based on an edit instruction entered using the first task information. Furthermore, the CPU of the client PC produces definition information of a second task cooperative job flow executable in a second task processing device based on the definition information of the created first cooperative job flow as well as based on second task information relating to tasks usable in the second print processing device.

12 Claims, 40 Drawing Sheets

U.S. PATENT DOCUMENTS

| | | |
|---|---|---|
| 2005/0111043 A1 | 5/2005 | Kato |
| 2005/0213144 A1 | 9/2005 | Uejo |
| 2005/0275859 A1 | 12/2005 | Kato |
| 2007/0044009 A1* | 2/2007 | Tokunaga .................... 715/500 |

FOREIGN PATENT DOCUMENTS

| | | |
|---|---|---|
| JP | 2002-74253 | 3/2002 |
| JP | 2004-287861 | 10/2004 |
| JP | 2004-288055 | 10/2004 |
| JP | 2005-271264 | 10/2005 |

OTHER PUBLICATIONS

European Search Report dated Nov. 22, 2012 issued during prosecution of related European application No. 06811248.1.

* cited by examiner

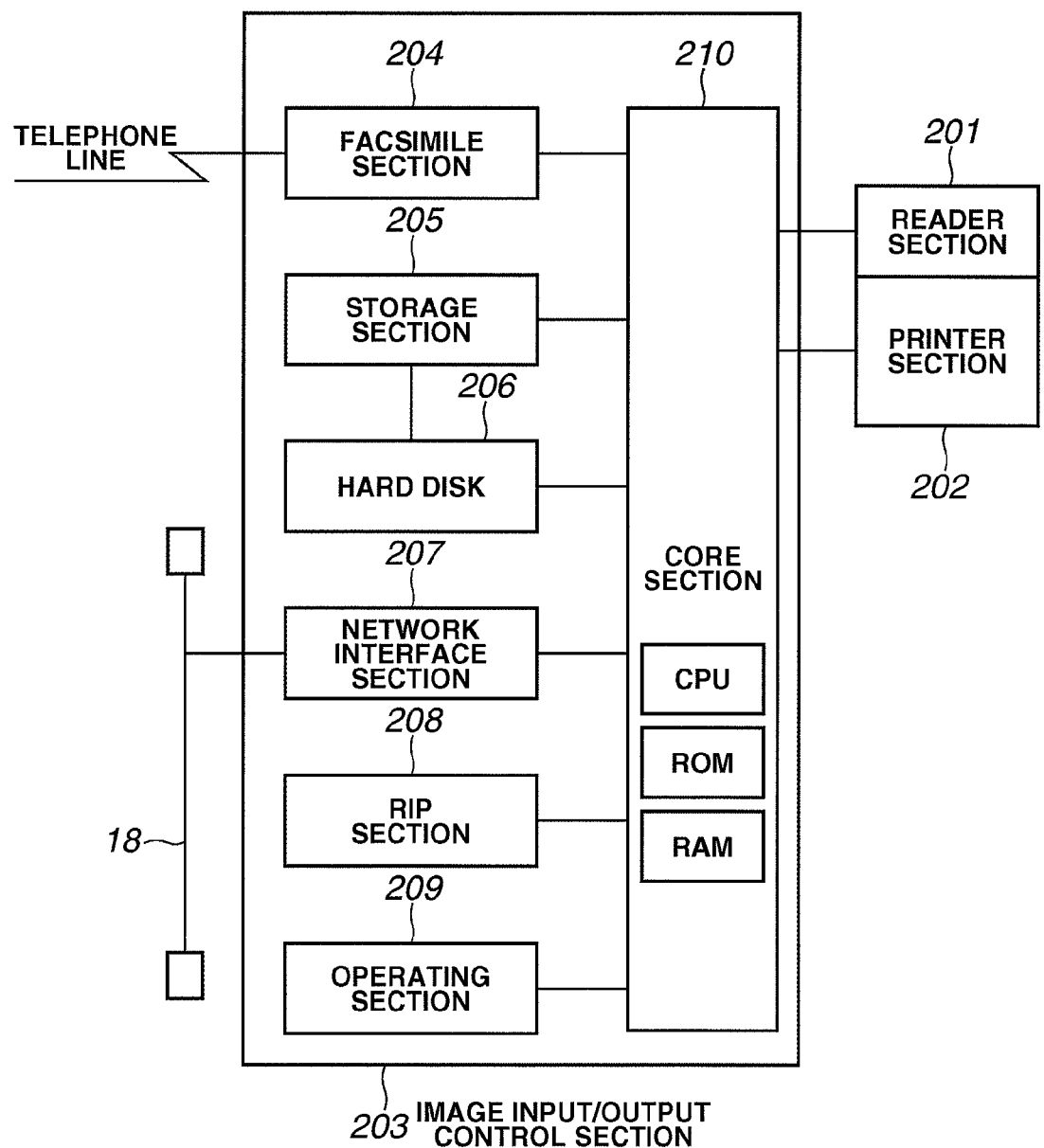

FIG.6B

```
<JobFlow1>
    <task1>
        <before>start</before>
        <after>task2</after>
        <after>task3</after>
        <property>
         DESCRIBED WHEN ATTRIBUTE INFORMATION IS PRESENT
        </property>
    </task1>
    <task2>
        <before>task1</before>
        <after>task4</after>
    </task2>
    <task3>
        <before>task1</before>
        <after>task4</after>
    </task3>
    <task4>
        <before>task2</before>
        <before>task3</before>
        <after>end</after>
    </task4>
</JobFlow1>
```

FIG.8

| TASK PROCESSING DEVICE | TASK GROUP NAME | TASK NAME |
|---|---|---|
| PRINT PROCESSING DEVICE A | PRINT | DIRECT PRINT |
| PRINT PROCESSING DEVICE A | PRINT | SECURE PRINT |
| PRINT PROCESSING DEVICE A | PDF | HIGH COMPRESSION |
| PRINT PROCESSING DEVICE A | PDF | ENCIPHERING |
| PRINT PROCESSING DEVICE A | PDF | SEARCHABLE |
| PRINT PROCESSING DEVICE A | MAIL TRANSMISSION | UNIVERSAL SEND |
| PRINT PROCESSING DEVICE B | PRINT | DIRECT PRINT |
| PRINT PROCESSING DEVICE B | PDF | ENCIPHERING |
| PRINT PROCESSING DEVICE B | PDF | SEARCHABLE |

```
<JobFlow1>
    <task1 name="SCAN" device="COMMON" >
        <before>start</before>
        <after>task2</after>
    </task1>
    <task2 name="PDF" device="COMMON" >
        <before>task1</before>
        <after>task3</after>
    </task2>
    <task2 name="PDF" device="PRINT PROCESSING DEVICE A" >
        <task2-1 name="HIGH-COMPRESSION PDF">
          <before>start</before>
          <after>task2-2</after>
        </task2-1>
        <task2-2 name="ENCIPHERING">
          <before>task2-1</before>
          <after>task2-3</after>
        </task2-2>
        <task2-3 name="SEARCHABLE">
          <before>task2-2</before>
          <after>end</after>
        </task2-3>
    </task2>
    <task2 name="PDF" device="PRINT PROCESSING DEVICE B" >
        <task2-1 name="ENCIPHERING">
          <before>start</before>
          <after>task2-2</after>
        </task2-1>
        <task2-2 name="SEARCHABLE">
          <before>task2-1</before>
          <after>end</after>
        </task2-2>
    </task2>
    <task3 name="MAIL TRANSMISSION" device="COMMON">
        <before>task2</before>
        <after>end</after>
    </task3>
</JobFlow1>
```

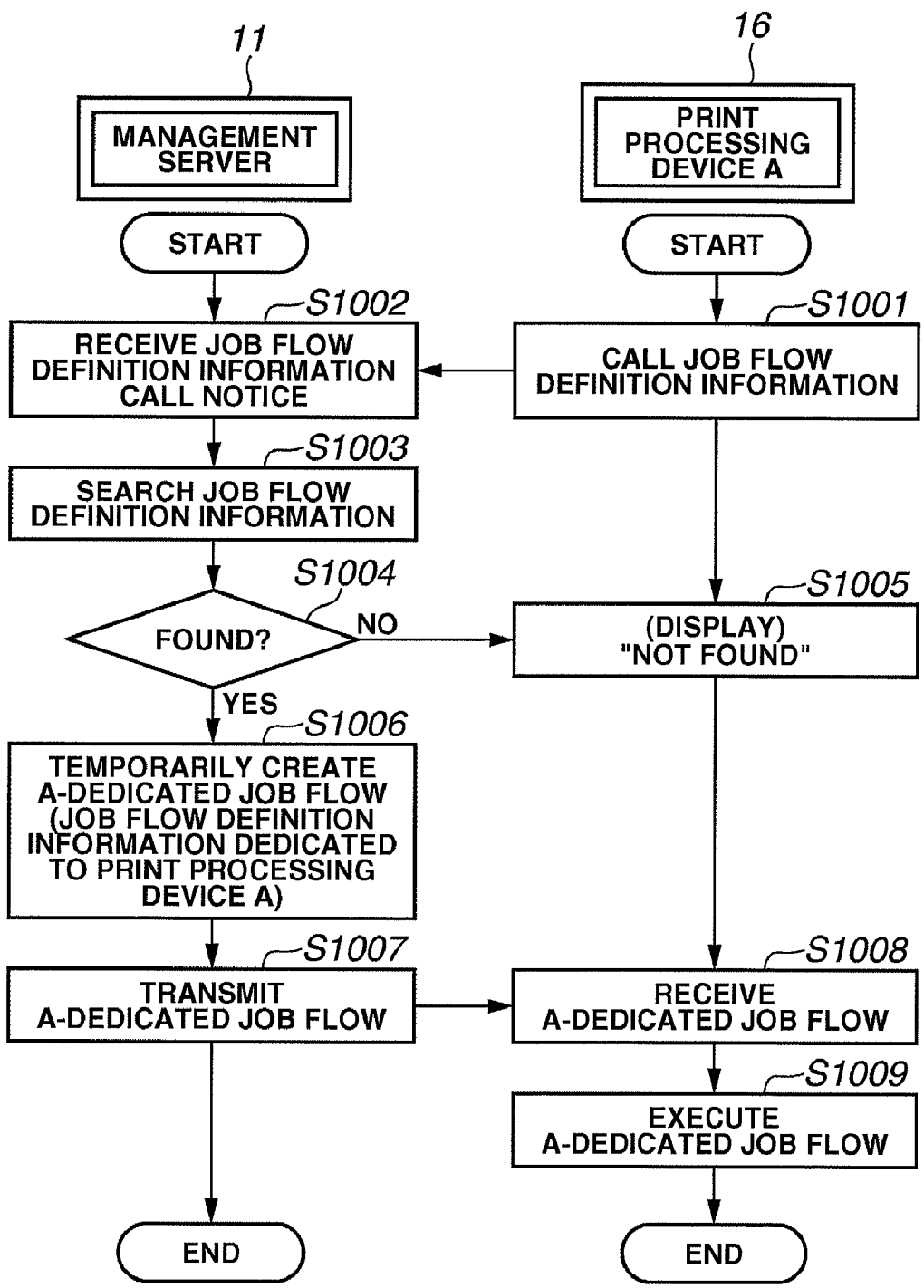

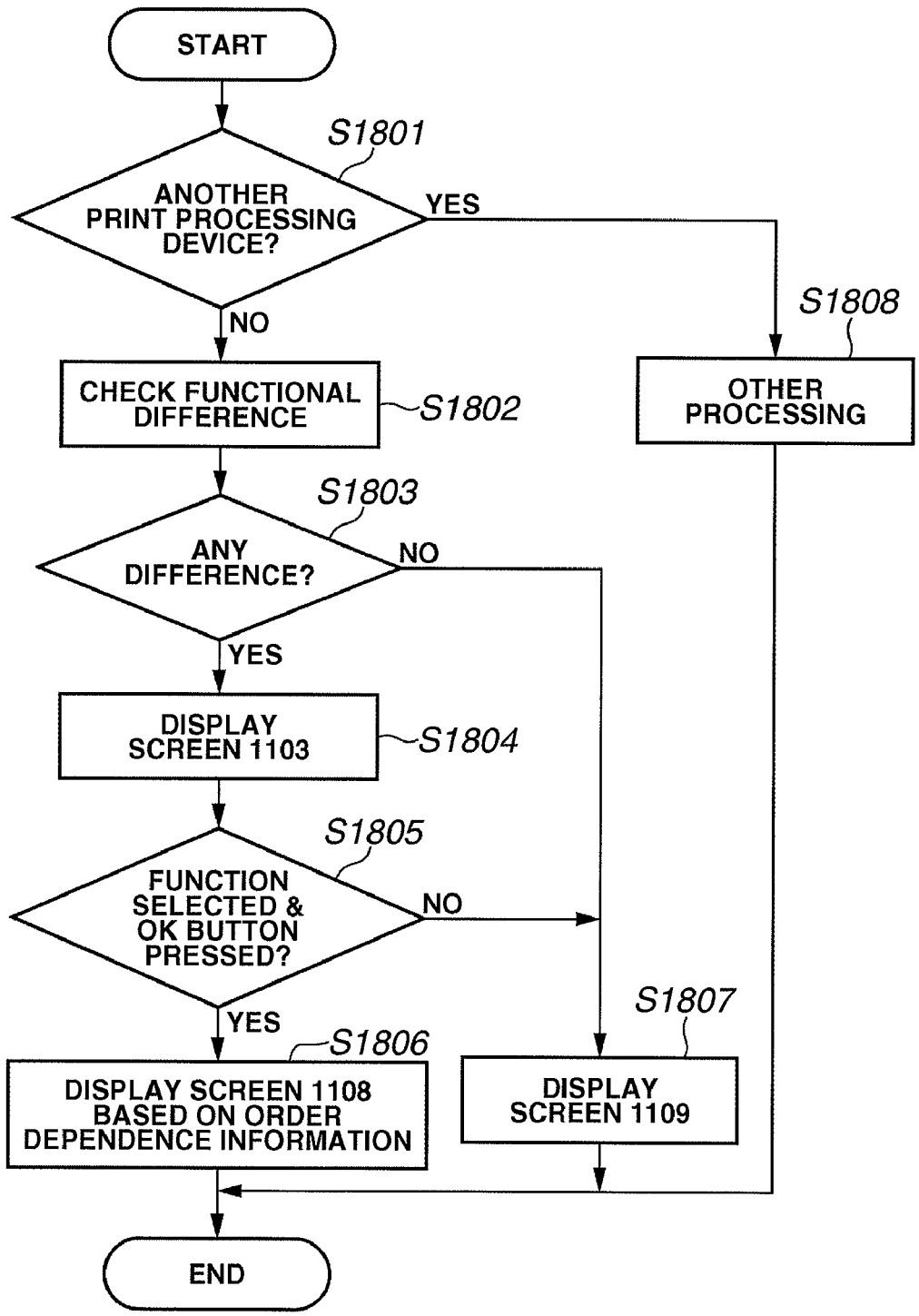

FIG.16

| TASK PROCESSING DEVICE (303) | TASK GROUP NAME (302) | TASK NAME (301) | AUTOMATICALLY ADDED (1201) | ORDER DEPENDENCE (1202) |
|---|---|---|---|---|
| PRINT PROCESSING DEVICE A | PRINT | DIRECT PRINT | OFF | NO |
| PRINT PROCESSING DEVICE A | PRINT | SECURE PRINT | OFF | NO |
| ... | ... | ... | ... | ... |
| PRINT PROCESSING DEVICE A | PDF | HIGH-COMPRESSION | ON | 1 |
| PRINT PROCESSING DEVICE A | PDF | ENCIPHERING | ON | 2 |
| PRINT PROCESSING DEVICE A | PDF | SEARCHABLE | ON | 3 |
| ... | ... | ... | ... | ... |
| PRINT PROCESSING DEVICE A | MAIL TRANSMISSION | UNIVERSAL SEND | OFF | NO |

```
<jobflow id="1" rule-id="1">
    <task1 name="SCAN"/>
    <task2 name="PDF"/>
    <task3 name="MAIL"/>
</jobflow>
```

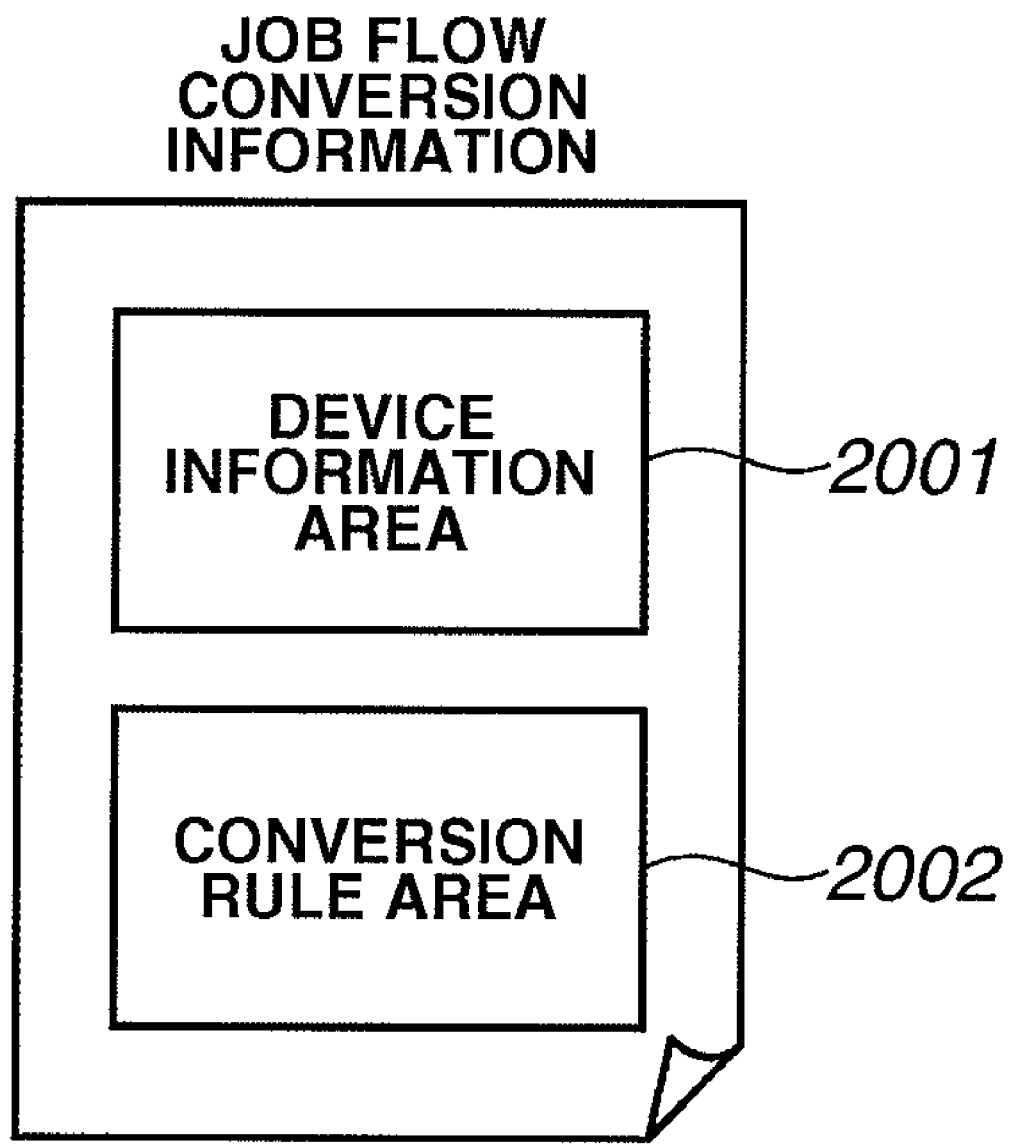

```
<devices>
     <device spec-id="1111111">
               ⋮
          <function name="PDF" impl="true">
               <function name="Comp PDF" impl="true"/>
          </function>
               ⋮
     </device>

<device spec-id="2222222">
               ⋮
          <function name="PDF" impl="true">
               <function name="Searchable PDF" impl="true"/>
          </function>
               ⋮
     </device>
               ⋮
</devices>
```

```
<rules>
    <rule rule-id="1">
        <device spec-id="1111111">
            <change from="PDF" to="Comp PDF"/>
              ⋮
        </device>
        <device spec-id="2222222">
              ⋮
        </device>
          ⋮
    </rule>
    <rule rule-id="2">
          ⋮
    </rule>
</rules>
```

FIG.25

DEVICE INFORMATION AREA

```
<devices>
    <device spec-id="1111111">
        <function name="PDF" impl="true">
        </function>
            ⋮
    </device>

<device spec-id="2222222">
        <function name="PDF" impl="true">
        </function>
            ⋮
    </device>
        ⋮
</devices>
```

CONVERSION RULE AREA

```
<rules>
    <rule rule-id="1">
        <device spec-id="1111111">
            ⋮
        </device>

<device spec-id="2222222">
            ⋮
        </device>
            ⋮
    </rule>
    <rule rule-id="2">
            ⋮
    </rule>
</rules>
```

FIG.27

DEVICE INFORMATION AREA

```
<devices>
    <device spec-id="1111111">
        <function name="PDF" impl="true">
            <function name="Comp PDF" impl="true"/>     ——2701
        </function>
        :
    </device>

<device spec-id="2222222">
        <function name="PDF" impl="true">
            <function name="Comp PDF" impl="false">    ——2702
        </function>
        :
    </device>
    :
</devices>
```

SPECIFYING THAT COMP PDF FUNCTION IS UNAVAILABLE AND ROUNDABLE INTO PDF

CONVERSION RULE AREA

```
<rules>
    <rule rule-id="1">
        <device spec-id="1111111">
            <change from="PDF" to="Comp PDF"/>    ——2703
            :
        </device>

<device spec-id="2222222">
            <change from="Comp PDF" to="PDF"/>    ——2704
            :
        </device>
        :
    </rule>
    <rule rule-id="2">
        :
    </rule>
</rules>
```

DETECTING ADDED CHANGE IN DEVICE INFORMATION AND UPDATE CONVERSION RULE

```
<jobflow id="2" rule-id="1">
    <task1 name="SCAN"/>
    <task2 name="Comp PDF"/>
    <task3 name="MAIL"/>
</jobflow>
```

FIG.31

DEVICE INFORMATION AREA

```
<devices>
    <device spec-id="1111111">
        <function name="PDF" impl="true">
            <function name="Comp PDF" impl="true">
        </function>
            ⋮
    </device>

<device spec-id="2222222">
        <function name="PDF" impl="true">
            <function name="Comp PDF" impl="true">      ~3101
        </function>
            ⋮
    </device>
        ⋮
</devices>
```

CONVERSION RULE AREA

```
<rules>
    <rule rule-id="1">
        <device spec-id="1111111">
            <change from="PDF" to="Comp PDF"/>
                ⋮
        </device>

<device spec-id="2222222">
            <change from="PDF" to="Comp PDF"/>     ~3102
                ⋮
        </device>
            ⋮
    </rule>
    <rule rule-id="2">
            ⋮
    </rule>
</rules>
```

MEMORY MAP IN STORAGE MEDIUM

FIG.34B

STORAGE MEDIUM OF FD/CD-ROM

| DIRECTORY INFORMATION |
|---|
| FIRST PROCESSING PROGRAM<br>PROGRAM CODE GROUP CORRESPONDING TO STEPS S502, S504, S505, S507, S508, S515, S516, S518, S520, AND S521 IN FIGS. 7A AND 7B |
| SECOND PROCESSING PROGRAM<br>PROGRAM CODE GROUP CORRESPONDING TO STEPS S1002, S1003, S1004, S1006, AND S1007 IN FIG. 12 |
| FOURTH PROCESSING PROGRAM<br>PROGRAM CODE GROUP CORRESPONDING TO STEPS S2103, AND S2105-S2108 IN FIG. 21 |
| FIFTH PROCESSING PROGRAM<br>PROGRAM CODE GROUP CORRESPONDING TO STEPS S2303, AND S2305-S2308 IN FIG. 23 |
| SIXTH PROCESSING PROGRAM<br>PROGRAM CODE GROUP CORRESPONDING TO STEPS S3301-S3311 IN FIG. 33 |

MEMORY MAP IN STORAGE MEDIUM

FIG.34C

STORAGE MEDIUM OF FD/CD-ROM

| DIRECTORY INFORMATION |
|---|
| FIRST PROCESSING PROGRAM<br>PROGRAM CODE GROUP CORRESPONDING TO<br>STEPS S503 AND S519 IN FIG. 7A |
| SECOND PROCESSING PROGRAM<br>PROGRAM CODE GROUP CORRESPONDING TO<br>STEPS S1001, S1005, S1008, AND S1009 IN FIG. 12 |
| FOURTH PROCESSING PROGRAM<br>PROGRAM CODE GROUP CORRESPONDING TO<br>STEPS S2101, S2102, S2104, AND S2109-S2112<br>IN FIG. 21 |
| FIFTH PROCESSING PROGRAM<br>PROGRAM CODE GROUP CORRESPONDING TO<br>STEPS S2301, S2302, S2304, AND S2309-S2312<br>IN FIG. 23 |

MEMORY MAP IN STORAGE MEDIUM

COOPERATIVE JOB FLOW CREATING APPARATUS, COOPERATIVE JOB FLOW CREATING METHOD, SERVICE PROCESSING APPARATUS, SERVICE PROCESSING METHOD, MANAGEMENT SERVER, FLOW CONVERSION METHOD, JOB FLOW EXECUTION METHOD, PROGRAM, AND STORAGE MEDIUM

TECHNICAL FIELD

The present invention relates to a technique enabling a user to create definition information of a task cooperative job flow including plural tasks executable as a series of cooperated job processing and usable in different task processing devices.

BACKGROUND ART

A multifunction peripheral, having plural functions, such as copy, facsimile, scan, and print functions, can realize a cooperative job processing system capable of processing a paper document based on copy and facsimile functions and also processing electronic document data on a personal computer.

More specifically, the multifunction peripheral can scan a paper document and transfer the scanned document data to a personal computer. The multifunction peripheral can receive a facsimile document and directly transmit received image data to a personal computer. Furthermore, it is desired to cooperate and automate succeeding procedures and processing based on electronic data of paper documents or facsimile documents.

Therefore, a conventional technique prepares cooperation templates describing desired settings with respect to various items of a multifunction peripheral, and enables a user to designate a desirable cooperation template and, if necessary, enables the user to change the setting values.

For example, a conventional image forming apparatus can store plural types of output setting data (i.e., cooperation templates) to form an output image according to an output format of selected output setting data (refer to Japanese Patent Application Laid-Open No. H10-083263).

Furthermore, the above-described image forming apparatus can not only perform settings of its own functions but also perform settings of other scanners or printers connected via a network, as well as settings of cooperative processing of an image forming system (refer to Japanese Patent Application Laid-Open No. 2004-287861).

However, according to the system disclosed in Japanese Patent Application Laid-Open No. 2004-287861, it is impossible or substantially restricted to include unique functions applied to a specific image forming apparatus (e.g., "high-compression PDF" function in a printer) in a cooperation template commonly usable among plural image forming apparatuses having different functions.

Accordingly, even if a cooperation template is commonly usable, the cooperation template cannot include highly advanced functions of individual image forming apparatuses.

Moreover, creating a cooperation template using unique functions of each apparatus encounters with the following problems. For example, a cooperation template cannot be commonly used among different machine types if a device has a plurality of machine types. Additionally, it is required to prepare many templates differentiated for individual machine types, although the contents of respective templates are similar to each other.

DISCLOSURE OF THE INVENTION

Embodiments of the present invention are directed to a technique capable of overcoming or at least mitigating the above-described problems.

Furthermore, at least one embodiment of the present invention is directed to a mechanism capable of creating and executing a cooperative job flow (corresponding to the above-described cooperation template) commonly usable among plural devices connected via a network to effectively and flexibly utilize their functions.

Moreover, at least one exemplary embodiment of the present invention is directed to a mechanism capable of flexibly converting a device independent cooperative job flow into a device dependent cooperative job flow and executing the converted job flow in each device.

More specifically, according to an aspect of the present invention, an information processing apparatus is configured to create definition information of a task cooperative job flow including plural tasks executable as a series of cooperated job processing and usable in plural machine types of task processing devices including first and second task processing devices mutually different in machine type. The information processing apparatus includes a display unit, an editing creation unit, and a production unit. The display unit is configured to display first task information relating to plural tasks usable in the first task processing device, in creating definition information of a first task cooperative job flow executable in the first task processing device. The editing creation unit is configured to create definition information of the first task cooperative job flow based on an edit instruction entered using the first task information displayed by the display unit. And, the production unit is configured to produce definition information of a second task cooperative job flow executable in the second task processing device based on the definition information of the first cooperative job flow created by the editing creation unit as well as based on second task information relating to plural tasks usable in the second task processing device.

According to another aspect of the present invention, a cooperative task processing system is provided which includes plural machine types of task processing devices, a management server, and a client apparatus which can communicate with each other via a network. The client apparatus includes: a display unit configured to display first task information relating to plural tasks usable in a first task processing device, in creating definition information of a first task cooperative job flow executable in the first task processing device corresponding to one of the plural machine types of task processing devices; an editing creation unit configured to create definition information of the first task cooperative job flow based on an edit instruction entered using the first task information displayed by the display unit; a production unit configured to produce definition information of a second task cooperative job flow executable in a second task processing device based on the definition information of the first cooperative job flow created by the editing creation unit as well as based on second task information relating to plural tasks usable in the second task processing device different in machine type from the first task processing device; and a first transmission unit configured to transmit the definition information of the task cooperative job flow produced by the production unit to the management server. The management server includes: a registration unit configured to store the definition information of the task cooperative job flow transmitted from the client apparatus in a storage unit, and a second transmission unit configured to transmit the definition information of the task cooperative job flow registered in the storage unit to any one of the task processing devices in accordance with a request from the one of the task processing devices. Each of the plural task processing devices includes an execution unit configured to obtain the definition information of the task cooperative job flow from the management server and execute the definition information of the task cooperative job flow.

According to yet another aspect of the present invention, a service processing apparatus is provided which includes a display unit configured to discriminately display common services applied to plural devices and unique services depending on individual devices, and a creation unit configured to create a flow incorporating services displayed on the display unit.

Furthermore, according to another aspect of the present invention, a service processing apparatus is provided which includes a storage unit configured to store unique services dedicated to a first device and unique services dedicated to a second device; and a creation unit configured to create a service flow of the second device from a service flow of the first device, based on the unique services dedicated to the first device and the unique services dedicated to the second device which are stored in the storage unit.

Still yet, according to another aspect of the present invention, a management server is provided which includes a storage unit configured to store device independent flow definition information defining a flow including plural tasks executable as a series of cooperated job processing, and conversion information for each device required to convert the device independent flow definition information into device dependent flow definition information; and a control unit configured to flexibly convert, in response to a flow execution request from a device, the flow definition information corresponding to the request into device dependent flow definition information based on conversion information corresponding to the device, and transmit the converted information to the device.

According to yet another aspect of the present invention, a cooperative task processing system is provided which includes a management server and plural devices. The management server includes: a storage unit configured to store device independent flow definition information defining a flow including plural tasks executable as a series of cooperated job processing, and conversion information for each device required to convert the device independent flow definition information into device dependent flow definition information; and a control unit configured to flexibly convert, in response to a flow execution request from a device, the flow definition information corresponding to the request into device dependent flow definition information based on conversion information corresponding to the device, and transmit the converted information to the device. Each of the plural devices includes an execution unit configured to obtain the device dependent flow definition information from the management server and execute the device dependent flow definition information.

Also, according to an aspect of the present invention, a task cooperative job flow creation method is provided for creating definition information of a task cooperative job flow including plural tasks executable as a series of cooperated job processing and usable in plural machine types of task processing devices including first and second task processing devices mutually different in machine type. The method includes: a display step of displaying first task information relating to plural tasks usable in the first task processing device, in creating definition information of a first task cooperative job flow executable in the first task processing device; an editing creation step of creating definition information of the first task cooperative job flow based on an edit instruction entered using the displayed first task information; and a production step of producing definition information of a second task cooperative job flow executable in the second task processing device based on the definition information of the created first cooperative job flow as well as based on second task information relating to plural tasks usable in the second task processing device.

According to another aspect of the present invention, a task cooperative job flow execution method is provided for creating definition information of a task cooperative job flow including plural tasks executable as a series of cooperated job processing and usable in a cooperative task processing system including plural machine types of task processing devices, a management server, and a client apparatus which can communicate with each other via a network. The client apparatus performs: a display step of displaying first task information relating to plural tasks usable in a first task processing device, in creating definition information of a first task cooperative job flow executable in the first task processing device corresponding to one of the plural machine types of task processing devices; an editing creation step of creating definition information of the first task cooperative job flow based on an edit instruction entered using the displayed first task information; a production step of producing definition information of a second task cooperative job flow executable in a second task processing device based on the created definition information of the first cooperative job flow as well as based on second task information relating to plural tasks usable in the second task processing device different in machine type from the first task processing device; and a first transmission step of transmitting the produced definition information of the task cooperative job flow to the management server. The management server performs: a registration step of storing the definition information of the task cooperative job flow transmitted from the client apparatus in a storage unit, and a second transmission step of transmitting the definition information of the task cooperative job flow registered in the storage unit to any one of the task processing devices in accordance with a request from the one of the task processing devices, wherein each of the plural task processing devices performs an execution step of obtaining the definition information of the task cooperative job flow from the management server and executing the definition information of the task cooperative job flow.

Yet further, according to another aspect of the present invention, a service processing method is provided so as to include: a display step of discriminately displaying common services applied to plural devices and unique services depending on individual devices, and a creation step of creating a flow incorporating services displayed on the display unit.

Additionally, according to another aspect of the present invention, a service processing method is provided so as to include: an obtaining step of obtaining unique services dedicated to a first device and unique services dedicated to a second device; and a creation step of creating a service flow of the second device from a service flow of the first device, based on the unique services dedicated to the first device and the unique services dedicated to the second device which are obtained in the obtaining step.

Moreover, according to another aspect of the present invention, a flow conversion method is provided which uses a storage unit configured to store device independent flow definition information defining a flow including plural tasks executable as a series of cooperated job processing, and conversion information for each device required to convert the device independent flow definition information into device dependent flow definition information. The flow conversion method includes: a step of flexibly converting, in response to a flow execution request from a device, the flow definition information corresponding to the request into device dependent flow definition information based on conversion information corresponding to the device, and transmitting the converted information to the device.

Moreover, according to another aspect of the present invention, a flow execution method is provided which uses a storage unit of a management server configured to store device independent flow definition information defining a flow including plural tasks executable as a series of cooperated job processing, and conversion information for each device required to convert the device independent flow definition information into device dependent flow definition information. The device performs a step of requesting execution of a flow corresponding to the flow definition information stored in the management server. The management server performs a step of flexibly converting, in response to a flow execution request from the device, the flow definition information corresponding to the request into device dependent flow definition information based on conversion information corresponding to the device, and transmitting the converted information to the device. And, the device performs a step of obtaining the device dependent flow definition information transmitted from the management server and executing the device dependent flow definition information.

Additionally, according to another aspect of the present invention, a computer-executable program is provided which includes computer-executable instructions for performing the processing of the above-described apparatuses, systems, and methods.

Also, according to another aspect of the present invention, a computer-readable storage medium is provided which stores a computer-executable program including instructions for performing the processing of the above-described apparatuses, systems, and methods.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3 is a block diagram illustrating the hardware arrangement of a multifunction peripheral that can function as print processing device A or print processing device B shown in FIG. 1.

FIG. 6B is a view showing an XML format of the job flow definition information shown in FIG. 6A.

FIG. 8 is a view showing an exemplary list format of the task definition information registered into a task list DB.

FIG. 11 is a view showing exemplary job flow definition information created according to the present exemplary embodiment.

FIG. 12 is a flowchart showing an example of a second control processing procedure performed by the cooperative task processing system in accordance with an exemplary embodiment.

FIG. 15 is a flowchart showing an example of a third control processing procedure performed by the cooperative task processing system in accordance with an exemplary embodiment.

FIG. 16 is a view showing an exemplary list format of the task definition information according to the present exemplary embodiment.

FIG. 20A is a view illustrating an exemplary arrangement of job flow conversion information in accordance with the fourth exemplary embodiment.

FIG. 20B is a view showing an example of a device information area shown in FIG. 20A.

FIG. 20C is a view showing an example of a conversion rule area shown in FIG. 20A.

FIG. 25 is a view illustrating a device information area and a conversion rule area on the management server in an initial condition.

FIG. 27 is a view illustrating a device information area and a conversion rule area on the management server in a condition where the "Comp PDF" function is newly applied to the device 1111111.

FIG. 31 is a view illustrating a device information area and a conversion rule area on the management server in a condition where the "Comp PDF" function is newly applied to the device 2222222.

FIG. 34B is a view illustrating an exemplary memory map of a storage medium (or recording medium) that can store various data processing programs readable by the management server of the cooperative task processing system according to an exemplary embodiment.

FIG. 34C is a view illustrating an exemplary memory map of a storage medium (or recording medium) that can store various data processing programs readable by the task processing device of the cooperative task processing system according to an exemplary embodiment.

BEST MODE FOR CARRYING OUT THE INVENTION

Figure 1:
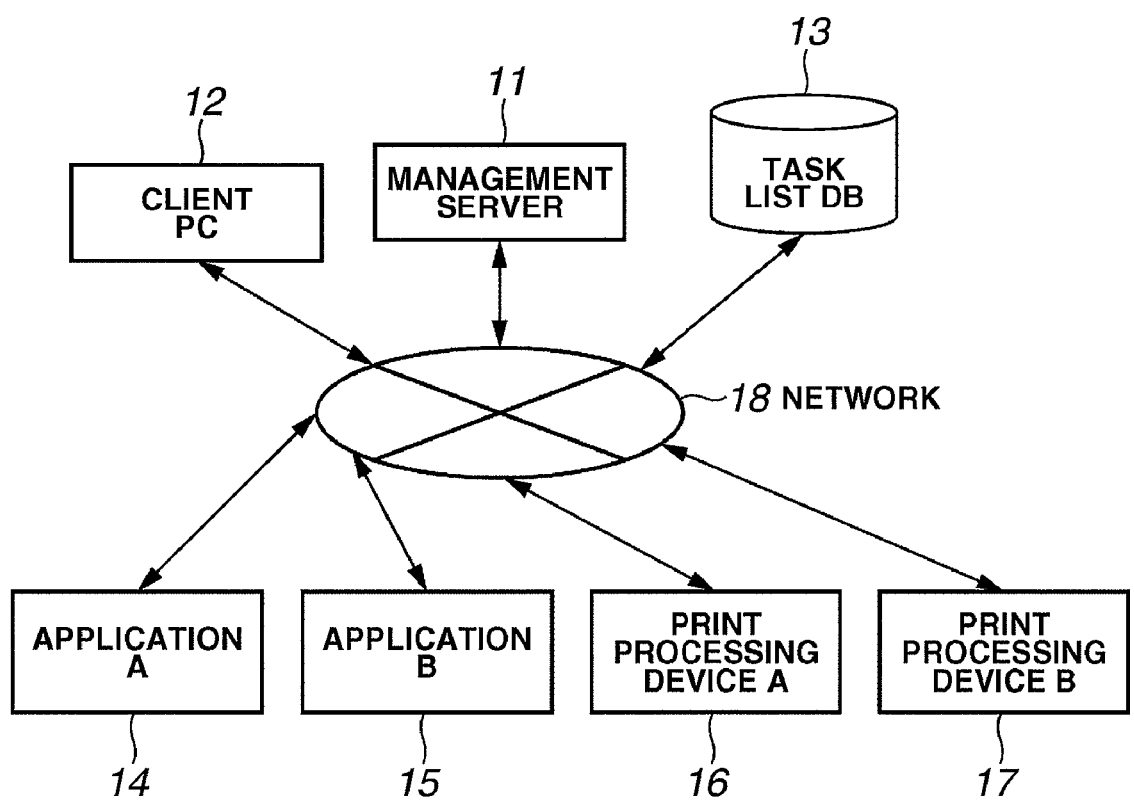
FIG. 1 is a diagram illustrating an example of the entire arrangement of a cooperative task processing system in accordance with an exemplary embodiment of the present invention.

The following description of exemplary embodiments is merely illustrative in nature and is in no way intended to limit the invention, its application, or uses.

Processes, techniques, apparatus, and materials as known by one of ordinary skill in the art may not be discussed in detail but are intended to be part of the enabling description where appropriate.

For example, certain circuitry for signal processing, calculating, displaying and other uses may not be discussed in detail. However these systems and the methods to fabricate these system as known by one of ordinary skill in the relevant art is intended to be part of the enabling disclosure herein where appropriate.

It is noted that throughout the specification, similar reference numerals and letters refer to similar items in the following figures, and thus once an item is defined in one figure, it may not be discussed for following figures.

Exemplary embodiments will be described in detail below with reference to the drawings.

FIRST EXEMPLARY EMBODIMENT

First, a system arrangement to which the present invention is applicable and related software arrangement will be described.

<System Arrangement>

FIG. 1 is a diagram illustrating an example of the entire arrangement of a cooperative task processing system in accordance with an exemplary embodiment.

The cooperative task processing system can realize a cooperative execution of various tasks including the tasks of print processing devices.

Furthermore, the task in the present invention can be defined as processing applied to document data. Furthermore, the task of the print processing device can be defined as various services including copy, scan, and facsimile transmission of document data, storage of document data into a hard disk in a print processing device, and mail transmission of document data.

Furthermore, the present cooperative task processing system can be cooperative not only with the print processing device that provides the above-described task but also with plural applications that can provide various tasks. Each application can be realized by a computer that can install an application program and can execute the program. In the following description, each application is described as one task processing device.

In the present invention, the print processing device and related software application that can execute the above-described tasks are defined as task processing device.

As shown in FIG. 1, the present cooperative task processing system includes a management server 11, a client PC 12, a task list database (DB) 13, an application A 14, an application B 15, a print processing device A 16, and a print processing device B 17, which are mutually connected via a network 18. The application A and the application B are examples of the above-described applications.

The total number of applications and print processing devices is not limited. Furthermore, the task list DB 13 can be prepared for each application or independent of the task management of the print processing device. The method of using the task list DB 13 is not limited.

The following exemplary cooperative task processing system performs operations based on two applications (i.e., application A 14 and application B 15) and two print processing devices (16, 17) which are connected with each other.

The management server 11 can manage the application A 14, the application B 15, the print processing device A 16, and the print processing device B 17. The task list DB 13 can manage a list listing tasks executable by individual task processing devices.

Furthermore, the client PC 12 can obtain executable tasks from the task list DB 13 via the management server 11, and can create a job flow as a combination of desired tasks.

In the exemplary embodiment, the job flow can be defined as a unit of plural tasks combined as a single job so as to continuously process plural tasks. The management server 11 can manage the created job flow as "job flow definition information" which the print processing devices 16 and 17 can execute. Details of the job flow definition information will be described later.

<Hardware Arrangement>

First, with reference to FIG. 2, the hardware arrangement of a computer that can realize the management server 11, the client PC 12, the task list DB 13, the application A 14, and the application B 15 shown in FIG. 1 will be described.

Figure 2:
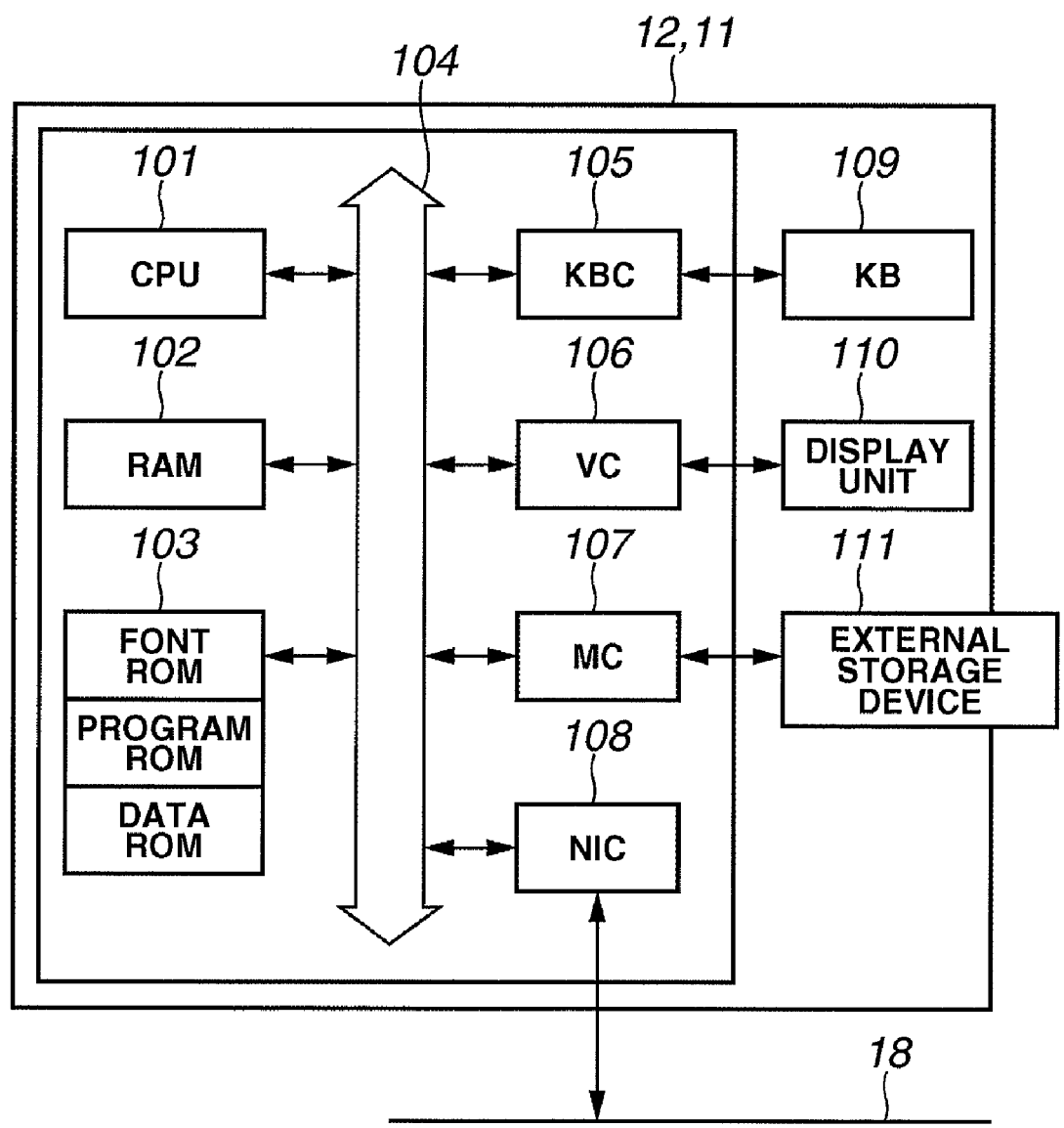
FIG. 2 is a block diagram illustrating the hardware arrangement of a computer that can realize a management server, a client PC, a task list database (DB), application A, and application B shown in FIG. 1.

FIG. 2 is a block diagram illustrating the hardware arrangement of a computer that can realize the management server 11, the client PC 12, the task list DB 13, the application A 14, and the application B 15 shown in FIG. 1.

As shown in FIG. 2, a CPU 101 can execute programs loaded into a RAM 102 from a program ROM of a ROM 103 and an external storage device 111, thereby realizing an integrated control of the computer. The CPU 101 can control each device connected to the system bus 104.

Furthermore, the ROM 103 includes a font ROM that can store font data and a data ROM that can store various data. The RAM 102 can function as a main memory and a work area of the CPU 101.

A keyboard controller (KBC) 105 can control signals and data entered from a keyboard (KB) 109 or a pointing device (not shown), such as a mouse. A video controller (VC) 106 can control a display unit 110, such as a CRT (cathode-ray tube), an LCD (liquid crystal display) or other display device.

A memory controller (MC) 107 can control an access from the external storage device 111 (e.g., a hard disk (HD), a flexible disk (FD), or a CD-ROM). A network interface card (NIC) 108 can control communications between the computer and the network 18.

Next, with reference to FIG. 3, the hardware arrangement of a multifunction peripheral that can function as the print processing device A 16 or the print processing device B 17 shown in FIG. 1 will be described.

FIG. 3 is a block diagram illustrating the hardware arrangement of a multifunction peripheral that can function as the print processing device A 16 or the print processing device B 17 shown in FIG. 1. In FIG. 3, a reader section 201 can read an image of a document, and can output image data corresponding to the document image to an image input/output control section 203. A printer section 202 can record, on a recording paper, an image based on the image data obtained from the image input/output control section 203. The image input/output control section 203, connected to the reader section 201 and the printer section 202, includes a facsimile section 204, a storage section 205, a network interface section 207, an RIP section 208, an operating section 209, and a core section 210.

The facsimile section 204 can extract compressed image data received from a telephone line, and can transfer the extracted image data to the core section 210. Furthermore, the facsimile section 204 can compress image data transferred from the core section 210 and can transmit the compressed image data via a telephone line. The transmitted/received image data can be temporarily stored in a hard disk 206 connected to the storage section 205.

The storage section 205 can compress the image data transferred from the core section 210, and can store, into the hard disk 206, the compressed image data together with an ID number required when the compressed image data is searched. Furthermore, the storage section 205 can search compressed image data stored in the hard disk 206 based on the code data transferred via the core section 210, then read and extract the compressed image data searched, and can transfer the extracted image data to the core section 210.

The network interface section 207 can function as an interface between the network 18 and the core section 210. The RIP section 208 can expand the code data (PDL) transferred from the network 18 into image data recordable by the printer section 202.

The operating section 209, equipped with a touch panel display unit and hard keys, can allow a user to input, via a user interface, operation instructions and operation settings for the image forming apparatus.

The core section 210 can control the flow of data transferred among the reader section 201, the printer section 202, the facsimile section 204, the storage section 205, the network interface section 207, the RIP section 208, and the operating section 209. The core section 210 includes a CPU, a ROM, and a RAM, so that the CPU 210 can load the program from the ROM into the RAM and execute the program to realize an integrated control of the entire apparatus.

<Operation Flow>

Hereinafter, an exemplary operation flow of the above-described cooperative task processing system will be described.

Figure 4A:
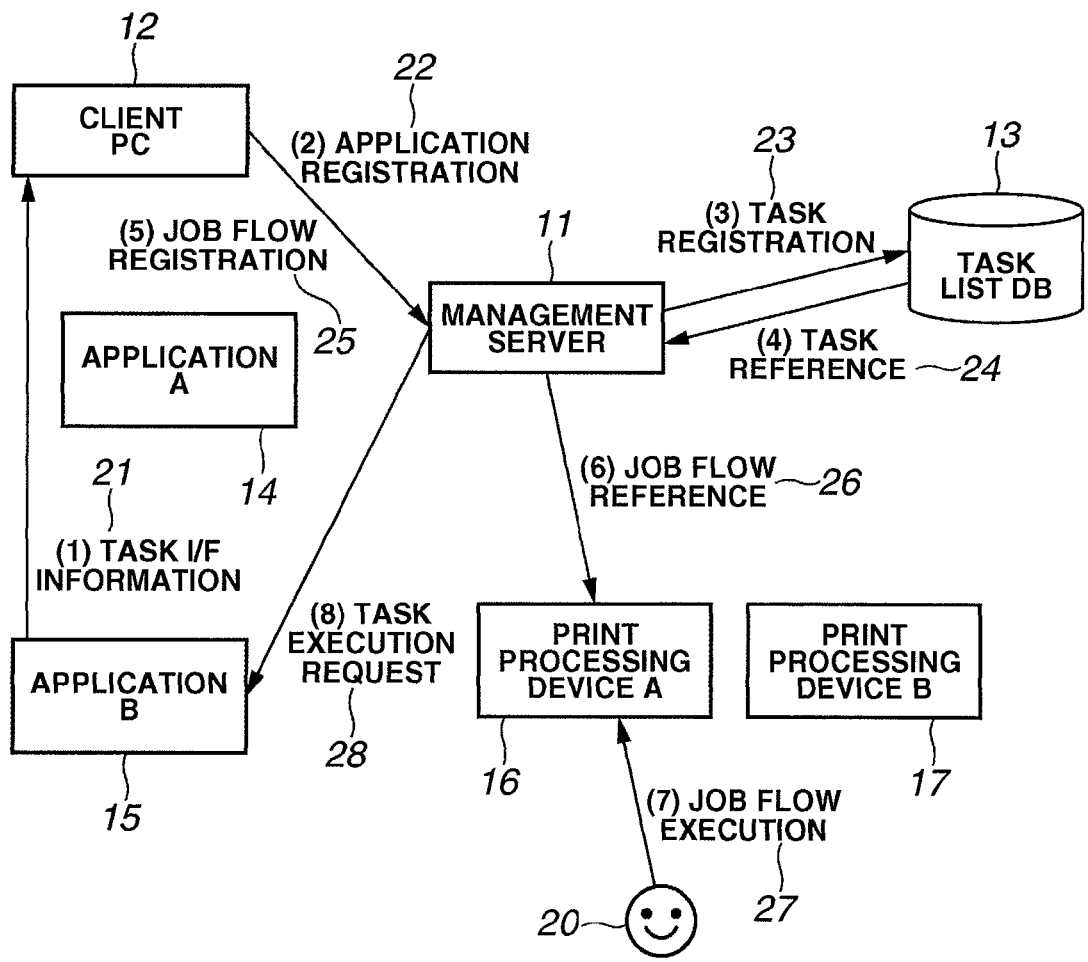
FIG. 4A is a diagram illustrating an operation flow of the cooperative task processing system shown in FIG. 1 according to the present exemplary embodiment, including addition of new application and execution of a job flow.
Figure 4B:
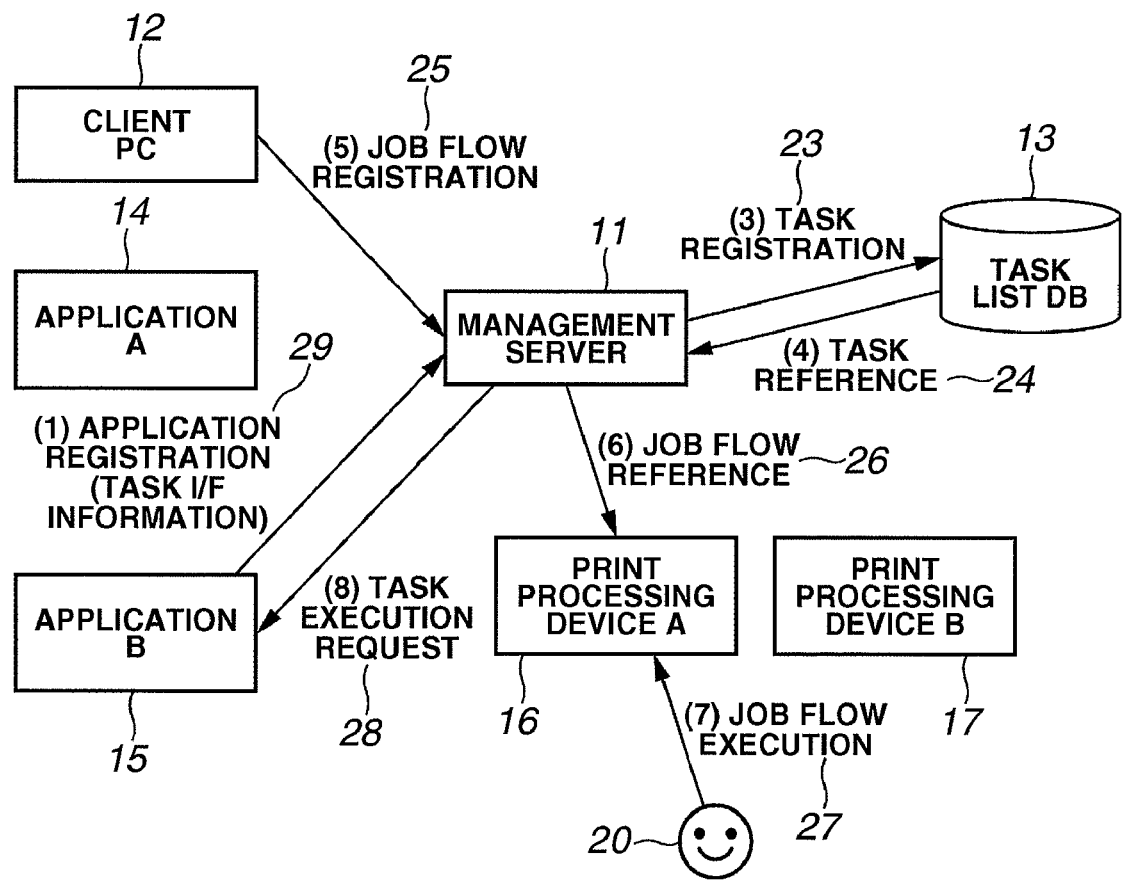
FIG. 4B is a diagram illustrating an operation flow of the cooperative task processing system shown in FIG. 1 according to the present exemplary embodiment, including addition of new application and execution of a job flow.

FIGS. 4A and 4B are diagrams each illustrating an operation flow of the cooperative task processing system shown in FIG. 1 according to the present exemplary embodiment, including addition of new application and execution of a job flow.

The operation flow shown in FIG. 4A is applicable to a system performing registration of an application via the client PC 12. The operation flow shown in FIG. 4B is applicable to a system performing registration of an application without using the client PC 12.

First, with reference to FIG. 4A, registration of an application performed via the client PC 12 will be described.

As shown in FIG. 4A, when the application B 15 is newly added to the present cooperative task processing system, the client PC 12 obtains task interface (I/F) information of the newly added application B 15 from the application B 15 (refer to procedure (1): task I/F information 21).

Next, the client PC 12 registers application information including obtained task I/F information into the management server 11 (refer to procedure (2): application registration 22). Then, the management server 11 registers task information into the task list DB 13 based on received application information (refer to procedure (3): task registration 23). Then, after accomplishing the registration of the application B 15 as an executable task, a job flow including the task of the application B 15 can be created.

The client PC 12 can instruct creation of a job flow. The client PC 12 refers to, via the management server 11, a task list registered in the task list DB 13 (refer to procedure (4): task reference 24). Then, the client PC 12 causes the management server 11 to create and register a job flow of desired tasks combined from referenced tasks (refer to procedure (5): job flow registration 25).

The management server 11 can manage the registered job flow. After accomplishing the registration of a job flow, the management server 11 can cause a print processing device (i.e., the print processing device A 16, or the print processing device B 17) to execute the registered job flow. In the present exemplary embodiment, the print processing device A 16 can execute the job flow in the following manner.

The print processing device A 16 can refer to a job flow list managed by the management server 11 (refer to procedure (6): job flow reference 26). Then, when a user 20 selects a desired job flow from the print processing device A 16 and executes the selected job flow (refer to procedure (7): job flow execution 27), the print processing device A 16 transmits a execution request of the selected job flow to the management server 11.

Then, based on the received execution request of the selected job flow, the management server 11 sends a task execution request to a task processing device that can execute the task involved in the job flow to execute the job flow (refer to procedure (8): task execution request 28).

The task definition information, including information identifying an actual task processing device that executes the required task in the job flow, or information identifying a task name, can be managed in the task list DB 13. Details of the task definition information will be described later with reference to FIG. 5.

Next, with reference to FIG. 4B, registration of an application performed without using the client PC 12 will be described. In FIG. 4B, components and procedures similar to those disclosed in FIG. 4A are denoted by the same reference numerals.

The operation flow of FIG. 4B is differentiated from the operation flow of FIG. 4A in the procedure of acquiring the task I/F information from a newly added application and the procedure of directly performing the registration of application from the newly added application B 15 to the management server 11.

According to the operation flow of FIG. 4B, when the application B 15 is newly added to the present cooperative task processing system, the application B 15 registers application information including task interface (I/F) information of the newly added application B 15 to the management server 11 (refer to procedure (1): application registration 29). The rest of the operation flow shown in FIG. 4B is identical to that shown in FIG. 4A and will not be described below.

<Task Definition Information>

Figure 5:
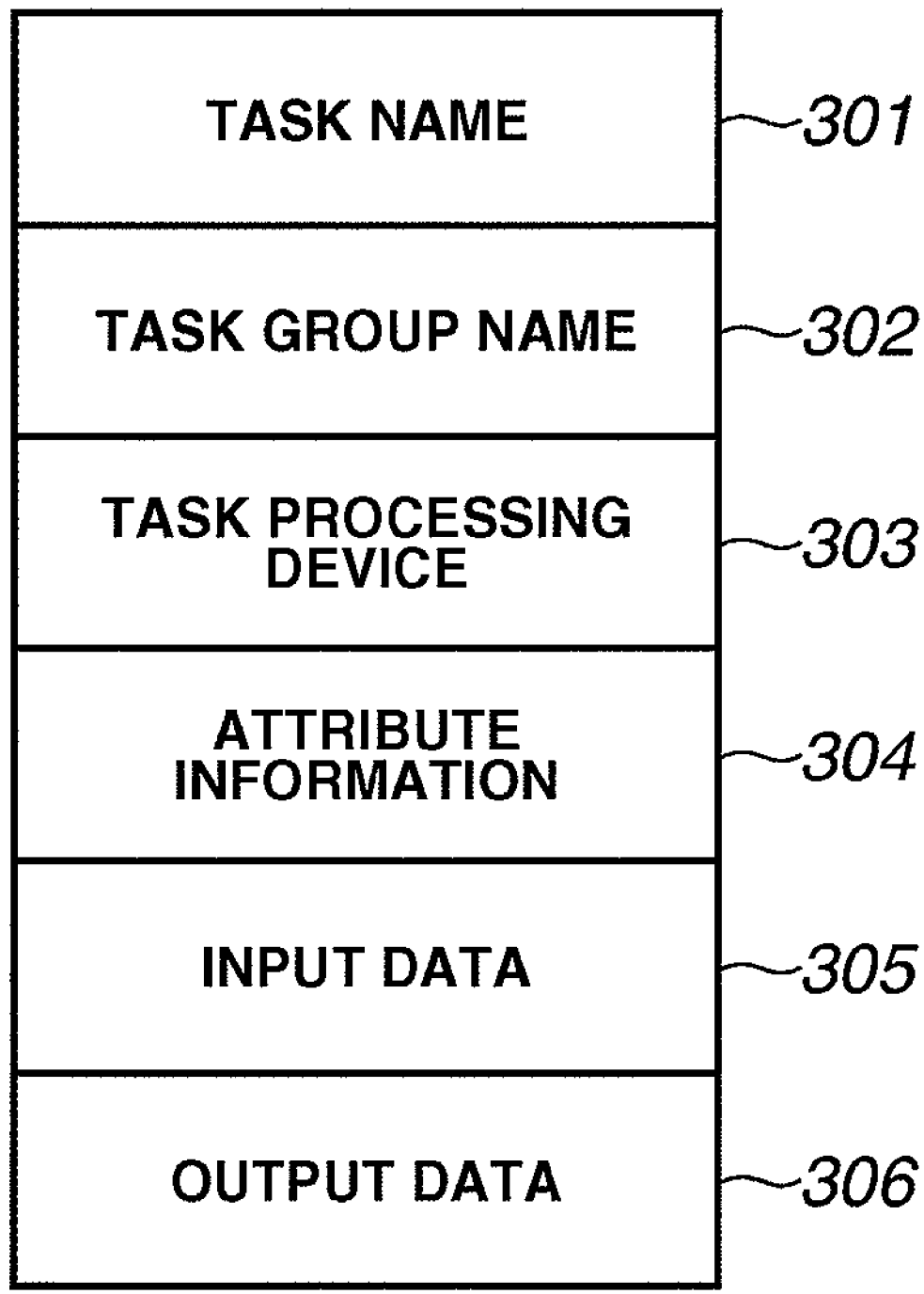
FIG. 5 is a view showing exemplary task definition information required when a task list is registered into a task list DB in accordance with an exemplary embodiment of the present invention.

FIG. 5 is a view showing exemplary task definition information required when a task list is registered into the task list DB 13 in accordance with an exemplary embodiment.

As shown in FIG. 5, the task definition information includes a task name 301, a task group name 302, a task processing device 303, attribute information 304, input data 305, and output data 306.

The task group name 302 is the name of a group including tasks classified (grouped) into the same category according to their functions. For example, the task group "PDF" includes a "high-compression PDF" task, an "enciphering" task, and a "searchable" task.

Furthermore, the task processing device 303 is information designating a task processing device that can execute the task. Furthermore, the attribute information 304 is information relating to attribute required when the task is executed.

Furthermore, the input data 305 is information indicating input data required when the task is executed. Furthermore, the output data 306 is information indicating data outputted after the task is executed. The format for describing the task definition information is not limited.

<Job Flow Definition Information>

Exemplary job flow definition information will be described below with reference to FIG. 6A and FIG. 6B.

Figure 6A:
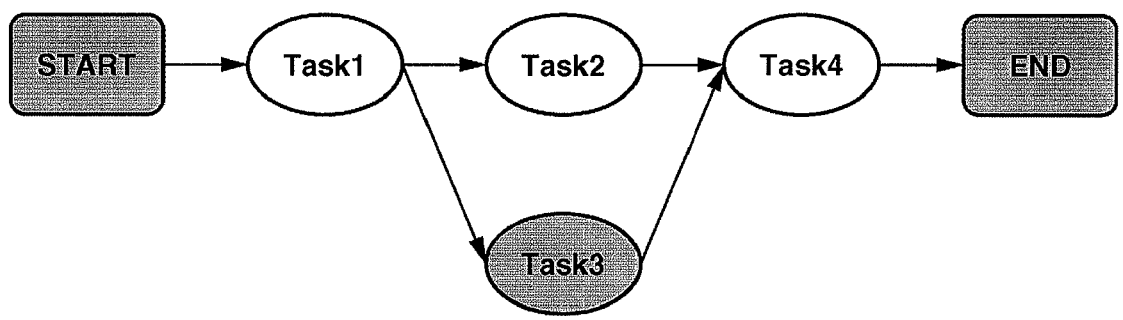
FIG. 6A is a diagram illustrating an exemplary job flow for describing job flow definition information in accordance with an exemplary embodiment.

FIG. 6A is a diagram illustrating an exemplary job flow for describing the job flow definition information in accordance with an exemplary embodiment.

According to the exemplary job flow shown in FIG. 6A, task 1 is first executed, then tasks 2 and 3 are simultaneously executed, and finally task 4 is executed.

FIG. 6B is a view showing an XML format of the job flow definition information shown in FIG. 6A.

In the present exemplary embodiment, to define a job flow, the XML format includes a <jobflow> tag (e.g., <jobflow1>), describing information relating to the job flow (i.e., information relating to tasks to be executed).

To define the execution order of tasks, the <jobflow> tag includes <task> tags (e.g., <task1>, <task2>, <task3>, and <task4>), each describing information relating to a designated task. Each <task> tag includes a <before> tag describing the name of each task to be executed before the designated task, and an <after> tag describing the name of each task to be executed after the designated task. Furthermore, each <task> tag can include a <property> tag describing information relating to attribute of the designated task if such attribute is defined in the task definition information.

The job flow definition information can be accomplished by describing the above-described definition for each task defined in the job flow.

More specifically, according to the job flow definition information shown in FIG. 6A, the <jobflow1> tag includes a <task1> tag, a <task2> tag, a <task3> tag, and a <task4> tag. Each <task> tag includes the information described for each task.

The task 1 has no preceding task and two succeeding tasks "task 2" and "task 3." Therefore, the information described in the <task1> tag is "<before>start</before>", "<after>task2</after>", and "<after>task3</after>."

Furthermore, each of the task 2 and the task 3 has a preceding task "task 1" and a succeeding task "task 4." Therefore, the information described in each of the <task2> tag and the <task3> tag is "<before>task1</before>" and "<after>task4</after>."

Furthermore, the task 4 has two preceding tasks "task 2" and "task 3" and no succeeding task. Therefore, the information described in the <task4> tag is "<before>task2</before>", "<before>task3</before>", and "<after>end</after>."

Description of the job flow definition information is not limited to the method shown in FIGS. 6A and 6B. The job flow definition information can be expressed by any format other than the XML format, as long as the order of tasks can be clearly shown.

<Exemplary Flowchart (for Creating Job Flow Definition Information)>

Figure 7A:
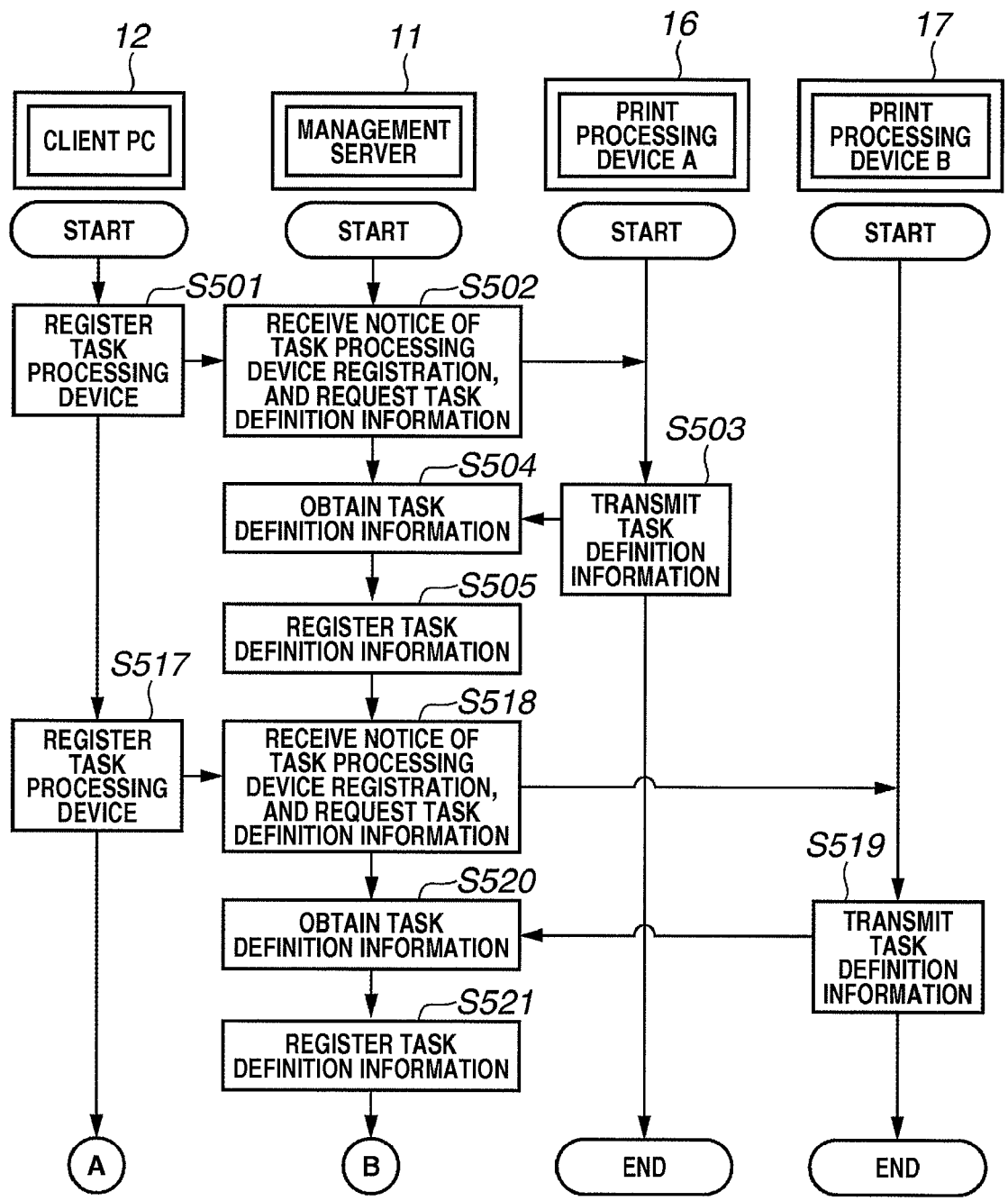
FIG. 7A is a flowchart showing an example of a first control processing procedure performed by the cooperative task processing system in accordance with an exemplary embodiment.
Figure 7B:
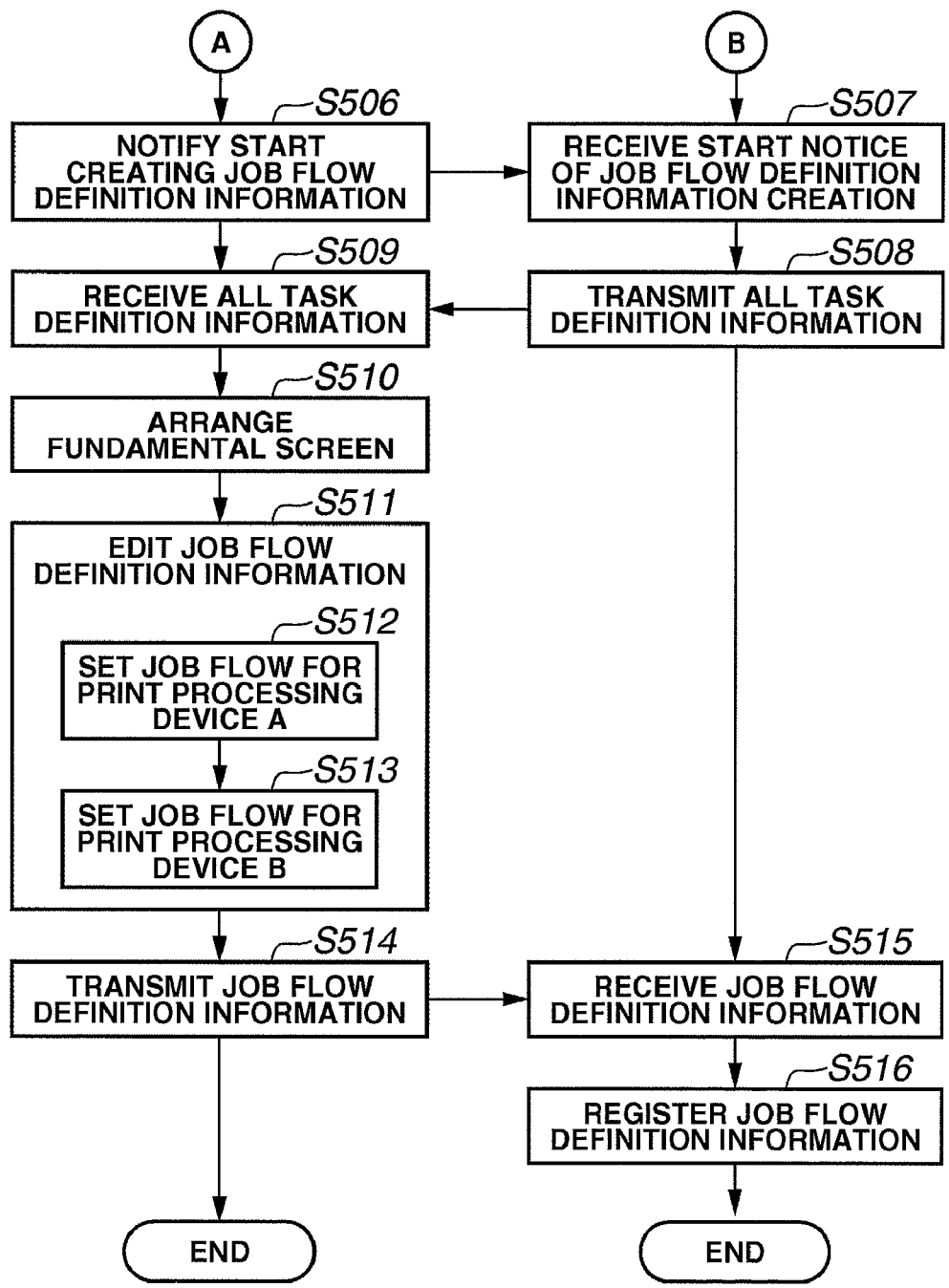
FIG. 7B is a flowchart showing an example of the first control processing procedure performed by the cooperative task processing system in accordance with the exemplary embodiment.

The flowchart of FIGS. 7A and 7B shows an example of a first control processing procedure performed in the cooperative task processing system in accordance with an exemplary embodiment, corresponding to the processing for creating the job flow definition information.

In FIGS. 7A and 7B, the processing of steps S501, S506, S509-S514, and S517 corresponds to the processing performed in the client PC 12. Furthermore, the processing can be realized by the CPU of the client PC 12 that can load the program from the external storage device into the RAM and execute the program. Alternatively, the CPU of the client PC 12 can execute the program on the web browser if the program is downloadable from the management server 11.

Furthermore, in FIGS. 7A and 7B, the processing of steps S502, S504, S505, S507, S508, S515, S516, S518, S520, and S521 corresponds to the processing performed in the management server 11. The processing can be realized by the CPU of the management server 11 that can load the program from the external storage device into the RAM and execute the program.

Furthermore, in FIG. 7A, the processing of steps S503 and S519 corresponds to the processing performed in the task processing device (i.e., the print processing device A 16 or the print processing device B 17). The processing can be realized by the CPU of the task processing device (i.e., the print processing device A 16, or the print processing device B 17) that can load the program from the ROM into the RAM and execute the program. Although the print processing device A 16 is described as a representative task processing device, the present exemplary flowchart can be applied to any other task processing device.

First, in the processing of steps S501-505 and steps S517-S521, the task definition information is registered into the task list DB 13.

First, in step S501, if a user requests registration of the print processing device A 16, the CPU of the client PC 12 notifies the management server 11 of starting the registration of the task processing device (i.e., print processing device A 16) based on a user's instruction. In this case, information (e.g., IP address) identifying the task processing device (i.e., print processing device A 16) is transmitted from the CPU of the client PC 12 to the management server 11. When a task processing device registration notice is received in step S502, and if the task definition information is already obtained from the print processing device A, the management server 11 skips the processing of step S502 (i.e., task definition information request) through step S505 (i.e., task definition information registration).

Next, if a notice of starting the registration of the task processing device is received in step S502, the CPU of the management server 11 requests the print processing device A 16 to transmit task definition information.

Then, in step S503, the CPU of the print processing device A 16 transmits the task definition information to the management server 11 in accordance with the transmission request received from the management server 11. For example, the task definition information of the print processing device A 16 is stored beforehand in the ROM of the print processing device A 16.

Then, in step S504, the CPU of the management server 11 receives the task definition information transmitted from the print processing device A 16. Then, in step S505, the CPU of the management server 11 registers the task definition information of the print processing device A 16 into the task list DB 13, so that the management server 11 can manage the registered task definition information.

Next, in step S517, if a user requests registration of the print processing device B 17, the CPU of the client PC 12 notifies the management server 11 of starting the registration of the task processing device (i.e., print processing device B 17) in accordance with a user's instruction. In this case, information (e.g., IP address) identifying the task processing device (i.e., print processing device B 17) is transmitted from the CPU of the client PC 12 to the management server 11. When a task processing device registration notice is received in step S518, and if the task definition information is already obtained from the print processing device B, the management server 11 skips the processing of step S518 (i.e., task definition information request) through step S521 (i.e., task definition information registration).

Next, if a notice of starting the registration of the task processing device is received in step S518, the CPU of the management server 11 requests the print processing device B 17 to transmit task definition information.

Then, in step S519, the CPU of the print processing device B 17 transmits the task definition information to the management server 11 in accordance with the transmission request received from the management server 11. For example, the task definition information of the print processing device B 17 is stored beforehand in the ROM of the print processing device B 17.

Then, in step S520, the CPU of the management server 11 receives the task definition information transmitted from the print processing device B 17. Then, in step S521, the CPU of the management server 11 registers the task definition information of the print processing device B 17 into the task list DB 13, so that the management server 11 can manage the registered task definition information.

By repeating the processing similar to steps S501-S505 or steps S517-S521, task definition information of other task processing devices, such as print processing devices C, D, and E (not shown), can be registered.

In the present exemplary embodiment, the client PC 12 designates each task processing device and registers the task definition information of this task processing device.

However, the embodiment can be modified in various ways as long as the task definition information can be utilized in the job flow definition information creation and execution processing which is later described. Accordingly, the present exemplary embodiment does not limit the method for registering the task definition information or the place where the task definition information is registered.

For example, a user can register task definition information relating to each print processing device in the client PC 12 beforehand. Alternatively, a group administrator of a plurality of print processing devices can register all of task definition information of individual print processing devices into the management server 11.

The task definition information registered in the task list DB 13 will be described below with reference to FIG. 8.

FIG. 8 is a view showing an exemplary list format for the task definition information registered into the task list DB 13 in steps S505 and S521 of FIG. 7A. In FIG. 8, items similar to those shown in FIG. 5 are denoted by the same reference numerals. Furthermore, the exemplary list format of FIG. 8 omits the attribute information 304, the input data 305, and the output data 306.

As shown in FIG. 8, the type of each task is differentiated according to the type of each task processing device. For example, a total of three tasks "high compression", "enciphering", and "searchable" belonging to the task group "PDF" can be registered for the print processing device A. On the other hand, only two tasks "enciphering" and "searchable" belonging to the task group "PDF" can be registered for the print processing device B.

In other words, the print processing device B has no "high compression" function. In this manner, considering the functions of each task processing device, the task definition information of each task processing device is registered into the task list DB 13.

Referring back to the flowchart of FIG. 7B, the processing of steps S506-S510 is for creating and displaying an editor screen that enables a user to create and edit the job flow definition information.

First, a user instructs the client PC 12 to create the job flow definition information via the keyboard or the like of the client PC 12. Then, in step S506, the CPU of the client PC 12 notifies the management server 11 of starting the creation of the job flow definition information.

Then, when a notice of starting the creation of the job flow definition information is received in step S507, the CPU of the management server 11 transmits all of the task definition information registered in the task list DB 13 to the client PC 12 (refer to step S508). Each job flow name of the job flow definition information registered in the management server 11 can be also transmitted to the client PC 12.

Then, in step S509, the CPU of the client PC 12 receives all of the task definition information and stores them in the RAM. Each job flow name of the job flow definition information can be also stored in the RAM.

Then, in step S510, the CPU of the client PC 12 arranges an editor screen used for creating the job flow definition information based on the received task definition information and controls the editor screen displayed on the display unit of the client PC 12.

In the present exemplary embodiment, all of the task definition information registered in the task list DB 13 is transmitted to the client PC 12 to arrange the editor screen.

However, the embodiment can be modified in various ways as long as the entire task definition information required for the editor screen is obtainable in the creation of the job flow definition information. Therefore, the arrangement of the editor screen is not limited in the present exemplary embodiment.

For example, the editor screen can be arranged based on the task definition information stored beforehand in the client PC 12. Furthermore, when a new printer is added to the system, it is possible to rearrange the editor screen based on the task definition information updated by adding only the information relating to the newly introduced printer.

An exemplary editor screen will be described with reference to FIGS. 9 and 10.

Figure 9:
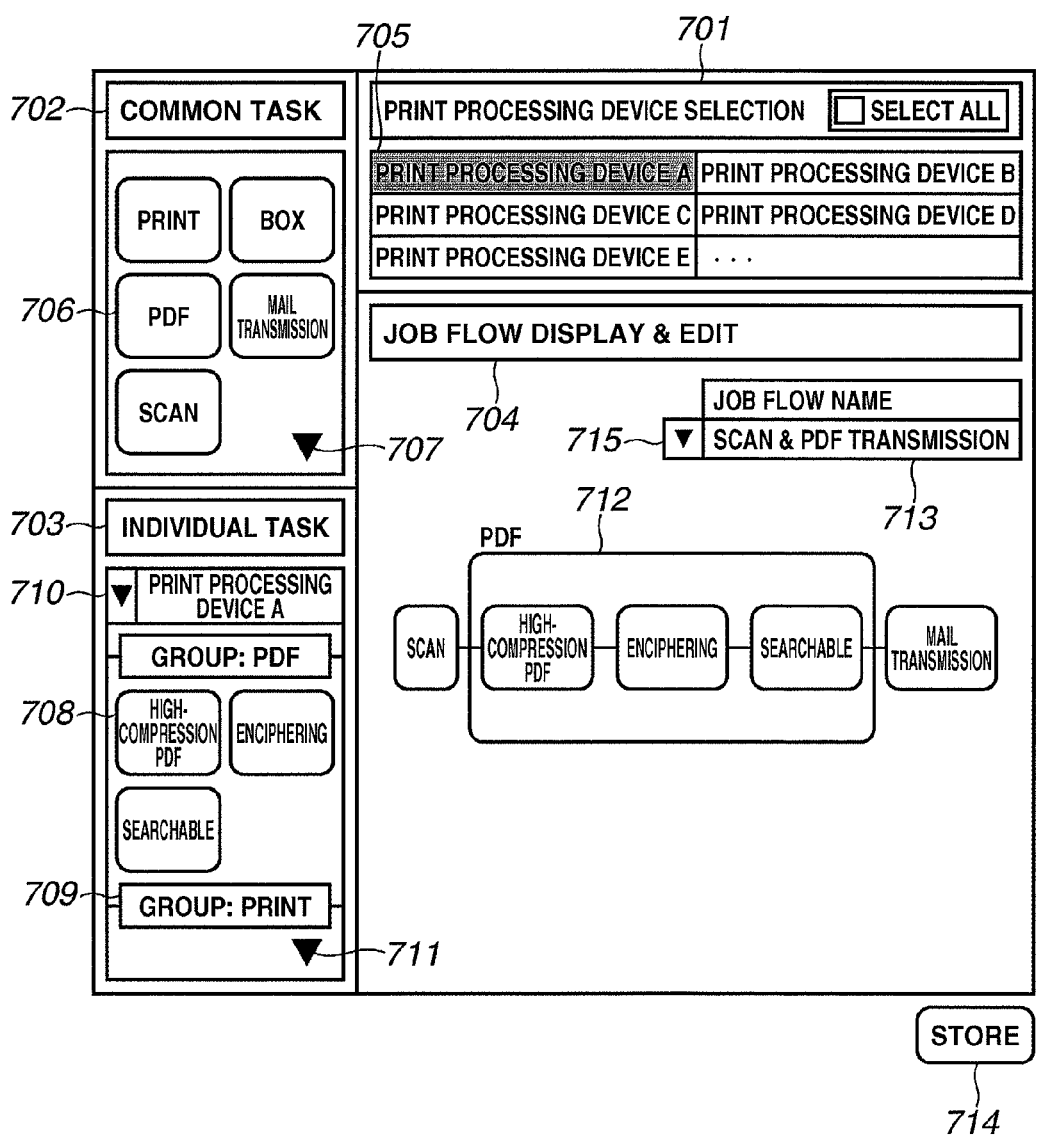
FIG. 9 is a view illustrating an exemplary editor screen that enables a user to create job flow definition information.
Figure 10:
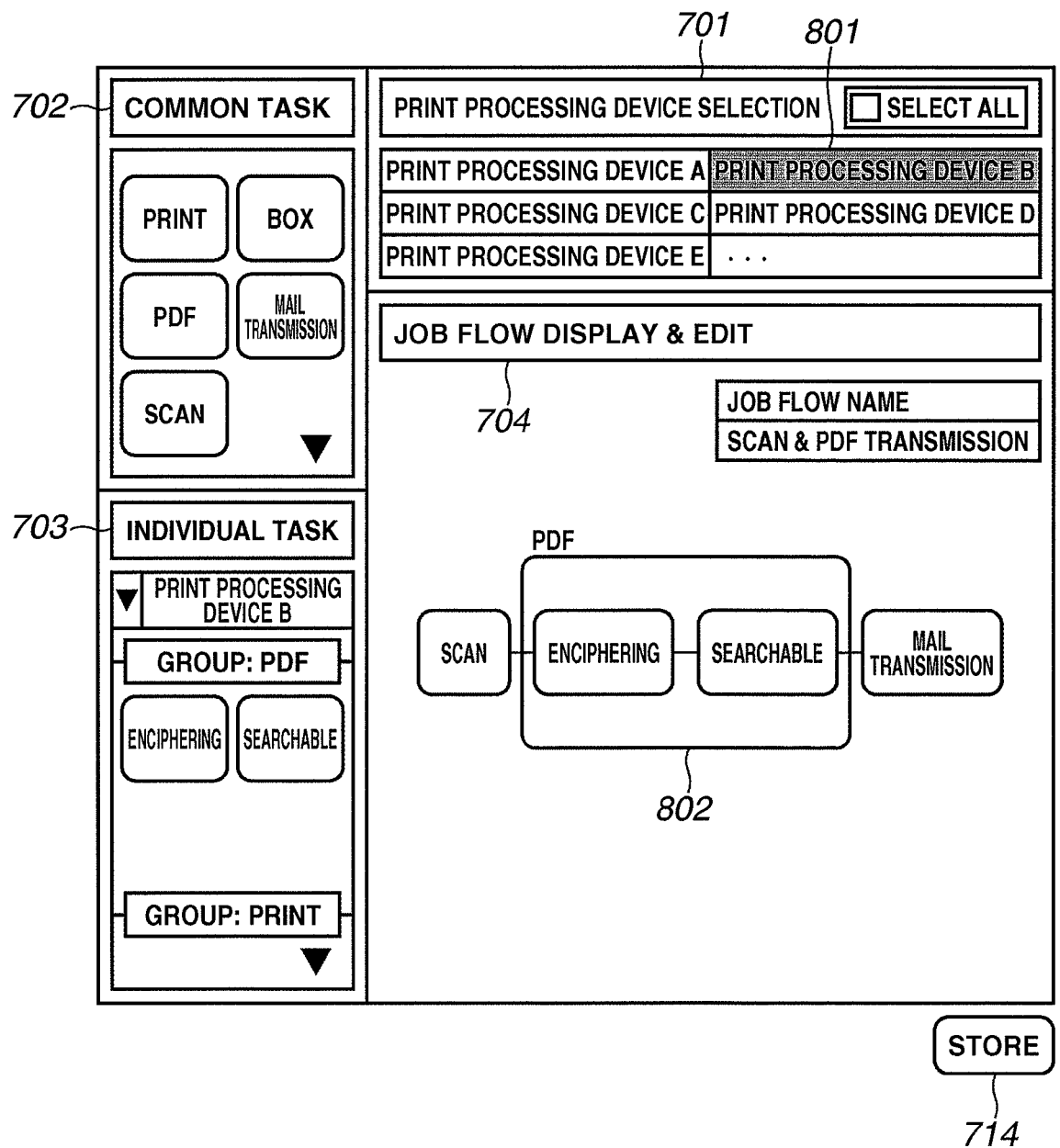
FIG. 10 is a view illustrating an exemplary editor screen that enables a user to create job flow definition information.

FIGS. 9 and 10 show an example of the editor screen arranged in step S510 of FIG. 7. The editor screen enables a user to create the job flow definition information. The CPU of the client PC 12 can control the editor screen displayed on the display unit.

As shown in FIG. 9, the editor screen includes a print processing device selection window 701, a common task list window 702, an individual task list window 703, a job flow display and edit window 704, and a storage button 714.

The print processing device selection window 701 can display a list of task processing device names extracted from the task definition information. A user can select a desired task processing device name on the displayed list with a mouse or other pointing device under the control of the CPU of the client PC 12.

When a desired task processing device name is selected by a user, the CPU of the client PC 12 can control the display of the editor screen so that the selected task processing device name can be highlighted as shown by 705 in FIG. 9. In the present exemplary embodiment, the format of FIG. 9 can realize the display of a list. However, the editor screen can be configured to have a hierarchical structure (for example, including a color printer and a monochrome printer in the first hierarchy and corresponding machine types in the second hierarchy).

The common task list window 702 can display task group names extracted from the task definition information. Each extracted task group name can be displayed as an icon, such as a "PDF" icon 706. The icons listed in the common task list window 702 can be referred to as common task icons. When the common task list window 702 cannot display all of common task icons, a user can scroll with a scroll bar 707 (under the control of the CPU of the client PC 12).

The individual task list window 703 can display tasks executable by the task processing device shown in the print processing device selection window 701. Each task can be displayed as an icon, such as a "high-compression PDF" icon 708. The icons displayed in the individual task list window 703 can be referred to as individual task icons.

Each displayed individual task icon can be determined based on the "task processing device" and the "task name" involved in the task definition information shown in FIG. 8. The information extracted from the task name can be displayed as a list. In this case, it is desirable to separate the display for each task group as indicated by 709. Furthermore, a combo box 710 can be used to switch the task processing device (i.e., target apparatus). Furthermore, when the individual task list window 703 cannot display all of individual task icons, a user can scroll with a scroll bar 711 (under the control of the CPU of the client PC 12).

The job flow display and edit window 704 enables a user to create or edit the job flow definition information. To create the job flow definition information, a user can drag a desirable common task icon from the common task list window 702 and a desirable individual task icon from the individual task list window 703 with a mouse or other pointing device.

When a series of individual task icons can constitute a task group, the job flow display and edit window 704 can display a common task icon (as indicated by 712). A user can delete each dragged task icon from the job flow display and edit window 704 by selecting the icon with the mouse of the client PC 12 and pressing a "Delete" key provided on the keyboard of the client PC 12.

Furthermore, the job flow display and edit window 704 can display a created job flow name (as indicated by 713). When a new job flow is created, the job flow name "new job flow" can be displayed. Furthermore, a user can change the job flow name by directly editing the text box 713 with the keyboard of the client PC 12.

Furthermore, a user can select desired job flow definition information from an existing list by pointing the list box 715 with the mouse of the client PC 12, and can edit the selected job flow definition information. More specifically, when the list box 715 is pointed by a user, the CPU of the client PC 12 displays a list of job flow names pre-stored in the RAM so that a user can select a desired one.

When a desirable job flow name is selected by a user, the CPU of the client PC 12 transmits, to the management server 11, a request of job flow definition information corresponding to the selected job flow name. On the other hand, upon reception of the request, the management server 11 searches corresponding job flow definition information and transmits the retrieved information to the client PC 12.

Then, the CPU of the client PC 12 receives the job flow definition information transmitted from the management server 11 and the job flow display and edit window 704 displays a job flow based on the job flow definition information. In this manner, a user can edit an existing job flow. The rest of the edit operation is similar to that of the above-described creation of a new job flow.

Furthermore, it is possible to display a job flow search window (not shown), so that a functional keyword such as "scan", "PDF", or "mail transmission" can be used to search an existing job flow. More specifically, the CPU of the client PC 12 displays the job flow search window to allow a user to input a desired keyword. When a keyword is input, the CPU of the client PC 12 transmits the keyword to the management server 11.

The CPU of the management server 11 receives the keyword and searches existing work flow definition information based on the received keyword, and transmits all of corresponding work flow names to the client PC 12. The CPU of the client PC 12 displays a list of received work flow names, so that a user can select a desired one. The rest of the operation is similar to that of the above-described operation performed by the pointing the list box 715 to select a work flow name.

After the job flow of the "print processing device A" is created as shown in FIG. 9, a user can select a "task processing device B" in the print processing device selection window 701 (as indicated by 801) as shown in FIG. 10. Thus, a user can create a job flow of the "task processing device B" based on the job flow of the created "print processing device A."

When the "print processing device B" 801 is selected in the print processing device selection window 701, the CPU of the client PC 12 switches the individual task list window 703 from the contents for the print processing device A to the contents for the print processing device B.

In the present exemplary embodiment, the print processing device B 17 cannot use the "high-compression PDF" task. Therefore, the CPU of the client PC 12 deletes a corresponding icon "high-compression PDF" 708 from the task list window 703 as shown in FIG. 10.

Furthermore, the CPU of the client PC 12 modifies the flow of the corresponding task portion (i.e., the "PDF" task portion 712 in FIG. 9) so as to correspond to the print processing device B, and create job flow definition information for the print processing device B 17. More specifically, the flow of executable tasks for the print processing device A indicated by 712 of FIG. 9 (i.e., "high-compression PDF"→"enciphering"→"searchable") is replaced with a flow of executable tasks for the print processing device B indicated by 802 of FIG. 10 (i.e., "enciphering"→"searchable"). The above-described replacement is performed based on the task definition information shown in FIG. 8.

When the storage button 714 is pressed by a user after the creation and edit processing of the above-described job flow is accomplished, the CPU of the client PC 12 registers the job flow definition information created on the present editor screen into the management server 11 (execution of registration processing).

Returning to step S511 of the flowchart of FIG. 7B, in response to a user's input, the CPU of the client PC 12 executes the creation and edit processing of the job flow definition information using the editor screen shown in FIG. 9. The job flow definition information created in the present exemplary embodiment includes a process of scanning a paper document, a process of formatting the scanned document into a PDF document, and a process of transmitting a mail with the PDF document. Both the print processing device A and the print processing device B can use the job flow.

First, in step S512, the CPU of the client PC 12 sets the job flow for the print processing device A 16.

When the "print processing device A" 705 is selected in the print processing device selection window 701, the CPU of the client PC 12 controls the individual task list window 703 to display individual task icons corresponds to the print processing device A 16 based on the task definition information shown in FIG. 8.

According to the present exemplary embodiment, three tasks of "high-compression PDF", "enciphering", and "searchable" are displayed. Then, a user can drag desirable common task icon(s) and individual task icon(s) from the common task list window 702 or the individual task list window 703 to the job flow display and edit window 704. Then, based on the dragged icon(s), the CPU of the client PC 12 creates job flow definition information and stores it in the RAM.

Next, in step S513, the CPU of the client PC 12 sets the job flow for the print processing device B 17.

When the "print processing device B" 801 is selected in the print processing device selection window 701, the CPU of the client PC 12 controls the individual task list window 703 to display individual task icons corresponds to the print processing device B 17 based on the task definition information shown in FIG. 8. As the print processing device B cannot perform the "high-compression PDF" task, a corresponding icon is not displayed.

Furthermore, the CPU of the client PC 12 modifies the flow of the corresponding task portion (i.e., the "PDF" task portion 712 in FIG. 9) based on the task definition information shown in FIG. 8, so as to correspond to the print processing device B 17. More specifically, the flow of executable tasks for the print processing device A 16 (i.e., "high-compression PDF"→"enciphering"→"searchable") is replaced with a flow of executable tasks for the print processing device B 17 (i.e., "enciphering"→"searchable").

Then, based on the replaced job flow, the CPU of the client PC 12 adds the information relating to the print processing device B 17 into the job flow definition information created in step S512 and stored in the RAM. As a result, job flow definition information commonly usable between the print processing device A 16 and the print processing device B 17 is obtained (refer to FIG. 11).

Then, in response to a user pressing the storage button 714, the CPU of the client PC 12 executes the processing of step S514.

In step S514, the CPU of the client PC 12 transmits the job flow definition information created in step S511 and stored in the RAM (refer to FIG. 11) to the management server 11.

In step S515, the CPU of the management server 11 receives the transmitted job flow definition information. Then, in step S516, the CPU of the management server 11 registers the job flow definition information into its DB (e.g., an external storage device).

In the present exemplary embodiment, the method for transmitting the job flow definition information, the method for registering the job flow definition information, and the method for storing the job flow definition information are not limited.

FIG. 11 shows exemplary job flow definition information created according to the present exemplary embodiment.

As shown in FIG. 11, the <task2> tag portion is a "PDF" task portion, including detailed contents of the flow depending on the processing apparatus (i.e., "high-compression PDF", "enciphering" or the like) expressed in a hierarchical structure.

Furthermore, the <task2> tag describes a device attribute designating the task processing device, according to which an optimized job flow for each task processing device can be executed.

Furthermore, the <task2> tag can be prepared for each task processing device, so as to facilitate the management of the settings for plural files.

Furthermore, the <task2> tag can include a "common" device attribute, so that the operations of any processing apparatus other than the print processing device A or the print processing device B can be determined beforehand.

<Exemplary Flowchart (for Executing Job Flow Definition Information)>

FIG. 12 is a flowchart showing an example of a second control processing procedure performed by the cooperative task processing system in accordance with the present exemplary embodiment, which corresponds to the processing flow for executing the job flow definition information.

In FIG. 12, the processing of steps S1001, S1005, S1008, and S1009 corresponds to the processing performed in the task processing device (i.e., print processing device A 16). Furthermore, the processing can be realized by the CPU of the task processing device (print processing device A 16) that can load the program from the ROM into the RAM and execute the program. Although the print processing device A 16 is described as a representative task processing device, the present exemplary flowchart can be applied to any other task processing device.

Furthermore, the processing of steps S1002, S1003, S1004, S1006, and S1007 corresponds to the processing performed in the management server 11. Furthermore, the processing can be realized by the CPU of the management server 11 that can load the program from the external storage device into the RAM and execute the program.

A user can input the name of desired job flow definition information to be executed via the operating section of the print processing device A 16, to call the desired job flow definition information.

For example, the operating section of the print processing device A 16 can display a list of all names of work flow definition information registered in the management server 11 to let a user select desired name(s). In this case, the CPU of the print processing device A 16 requests the management server 11 to transmit the above-described all names of work flow definition information registered in the management server 11. The management server 11 transmits the requested names to the print processing device A 16.

For example, a user can input a functional keyword such as "scan", "PDF", or "mail transmission" on the operating section of the print processing device A 16, to search an existing job flow. More specifically, when a keyword is input from the operating section of the print processing device A 16, the CPU of the print processing device A 16 transmits the keyword to the management server 11. The CPU of the management server 11 receives the keyword and searches existing work flow definition information based on the received keyword, and transmits all of corresponding work flow names to the print processing device A 16. The CPU of the print processing device A 16 displays a list of received work flow names on the operating section, so that a user can select a desired one.

As described above, when the operating section of the print processing device A 16 receives a job flow name requested by a user, the CPU of the print processing device A 16 transmits, to the management server 11, a job flow definition information call notice corresponding to the job flow name requested by the user (refer to in step S1001).

In step S1002, the CPU of the management server 11 receives the job flow definition information call notice. Then, in step S1003, the CPU of the management server 11 searches job flow definition information corresponds to the job flow definition information call notice. In the present exemplary embodiment, the method for searching the job flow definition information is not limited.

Next, in step S1004, the CPU of the management server 11 determines whether requested job flow definition information is found. When the requested job flow definition information is not found, the CPU of the management server 11 notifies the result to the print processing device A 16.

Then, in step S1005, the CPU of the print processing device A 16 causes an operation panel of the operating section to display a message, such as "the designated job flow definition information is not found."

On the other hand, when the requested job flow definition information is found in step S1004, the processing flow proceeds to step S1006.

Then, in step S1006, the CPU of the management server 11 temporarily creates job flow definition information (i.e., apparatus A dedicated job flow) based on the searched job flow definition information (common to print processing devices A and B). Then, the CPU of the management server 11 stores the "apparatus A dedicated job flow" (i.e., the job flow definition information defining the job flow dedicated to the print processing device A 16) into the RAM.

Next, in step S1007, the CPU of the management server 11 transmits the "apparatus A dedicated job flow" created in step S1006 to the print processing device A 16.

In step S1008, the CPU of the print processing device A 16 receives the "apparatus A dedicated job flow" transmitted from the management server 11. Then, in step S1009, the CPU of the print processing device A 16 executes the received "apparatus A dedicated job flow."

Figure 13:
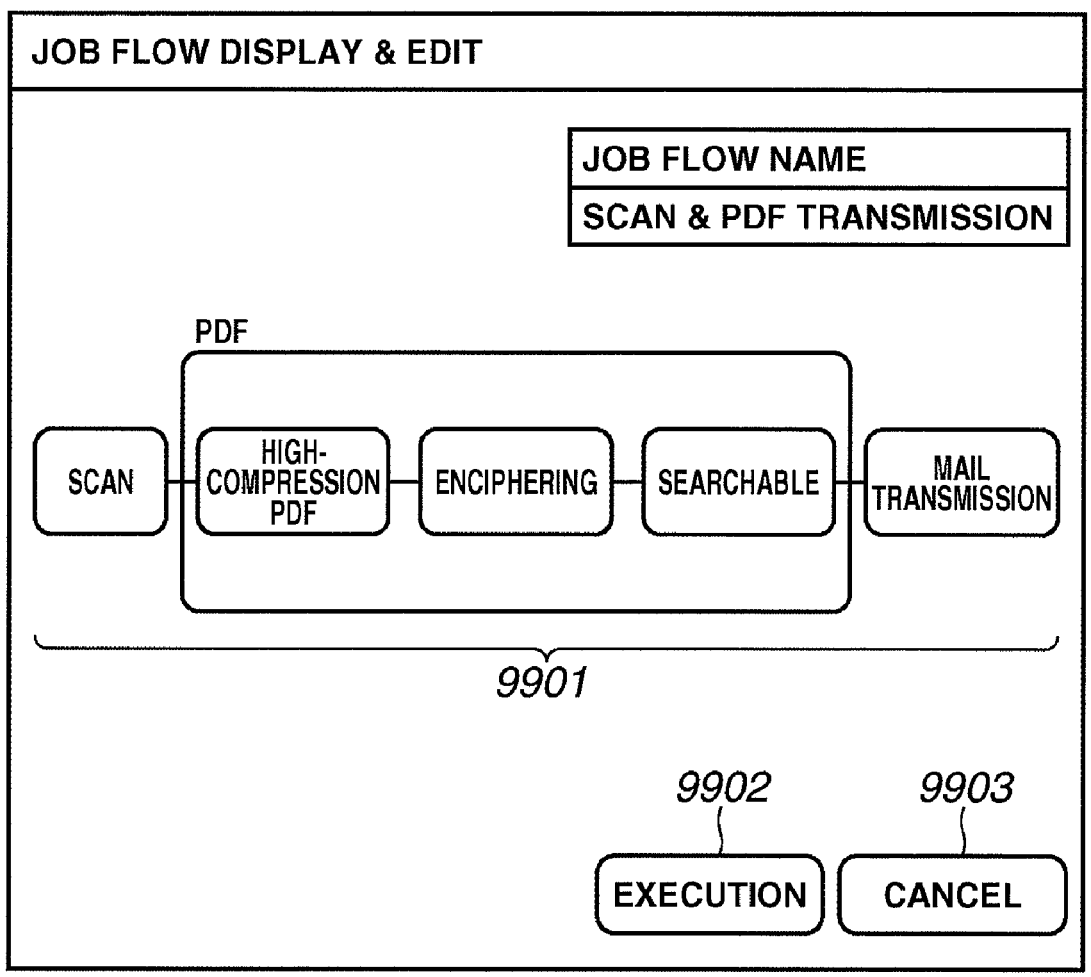
FIG. 13 is a view illustrating an exemplary execution confirmation screen displayed on an operating section of the print processing device A, immediately before executing a job flow.

In step S1009, the CPU of the print processing device A 16 can display an illustration of the "apparatus A dedicated job flow" as shown in FIG. 13 to let a user confirm the job contents before executing the received "apparatus A dedicated job flow."

FIG. 13 shows an exemplary execution confirmation screen displayed on the operating section of the print processing device A 16 prior to the execution of the job flow.

In FIG. 13, an illustration 9901 shows a job flow to be executed, which the CPU of the print processing device A 16 can display based on the "apparatus A dedicated job flow" received in step S1108 of FIG. 12.

When an execution button 9902 is pressed by a user, the CPU of the print processing device A 16 executes the displayed job flow (refer to 9901).

When a cancel button 9903 is pressed by a user, the CPU of the print processing device A 16 does not execute the displayed job flow. Furthermore, the processing flow returns to step S1001 of FIG. 12, in which the CPU of the print processing device A 16 lets a user input a job flow to be executed next.

As described above, the present exemplary embodiment can temporarily create a job flow dedicated to a particular apparatus based on the common job flow definition information applied to plural apparatuses. Each task processing device can receive and execute the created job flow. However, in the present exemplary embodiment, the method for executing the job flow definition information is not limited.

For example, the job flow definition information commonly applied to plural apparatuses can be directly transmitted to the task processing device, so that the task processing device can analyze and execute the job flow definition information.

Furthermore, the above-described exemplary embodiment creates a job flow commonly usable in different types of apparatuses, and registers the created job flow in the management server 11. However, it is possible to create a job flow dedicated to each apparatus (machine type) in step S511 (S512, S513) of FIG. 7B and register the job flow dedicated to each apparatus (machine type) in the management server 11 in steps S514 through S516. Furthermore, it is possible to transmit the job flow dedicated to the apparatus (machine type) in step S1007 of FIG. 12.

According to the above-described arrangement, the management server 11 stores the job flow definition information registered for each apparatus (machine type). However, the procedure for creating individual job flows is substantially similar to the above-described procedure for creating a common job flow.

As described above, the cooperative task processing system according to the present exemplary embodiment can create an optimized cooperative job flow according to inherent functions of each task processing device. One cooperative job flow can include common settings applicable to plural task processing devices and usable among different task processing devices. It is, therefore, unnecessary to create plural cooperative job flows considering the functional differences of individual task processing devices. Therefore, the management cost can be reduced and the usability can be improved.

Furthermore, a cooperative job flow including flows of plural task apparatuses can be easily created by automatically creating the flow of each task processing device based on the flow of another task processing device.

SECOND EXEMPLARY EMBODIMENT

According to the above-described first exemplary embodiment, the job flow of the print processing device A having a larger number of functions is first created and, subsequently, the job flow of the print processing device B having a smaller number of functions is created.

The second exemplary embodiment is characterized in that the job flow of an apparatus having a smaller number of functions is first created. Then, the job flow of an apparatus having a greater number of functions is created. In other words, the processing according to the second exemplary embodiment is differentiated only in steps S512 and S513 of FIG. 7B according to the first exemplary embodiment.

Furthermore, similar to the above-described first exemplary embodiment, the job flow definition information created in the present exemplary embodiment includes a process of scanning a paper document, a process of formatting the scanned document into a PDF document, and a process of transmitting a mail with the PDF document.

Both the print processing device A and the print processing device B can use the job flow.

Figure 14:
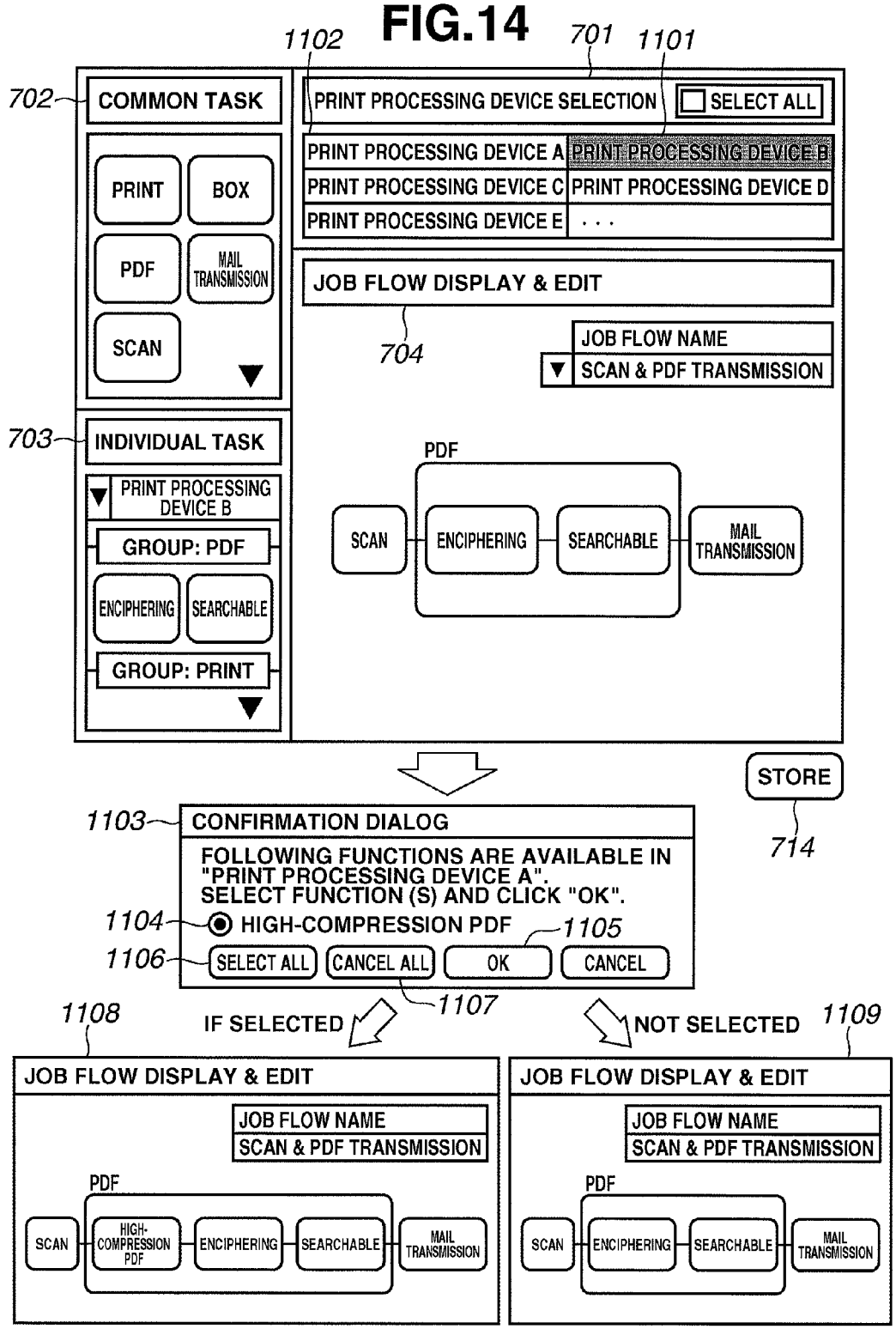
FIG. 14 is a view illustrating job flow definition information creation processing performed by the cooperative task processing system according to a second exemplary embodiment.

FIG. 14 is a view illustrating job flow definition information creation processing performed by the cooperative task processing system according to the second exemplary embodiment. In FIG. 14, items similar to those illustrated in FIGS. 9 and 10 are denoted by the same reference numerals.

First, the present exemplary embodiment performs the settings of "print processing device B dedicated job flow."

As shown in FIG. 14, a user can select a "print processing device B" 1101 in the print processing device selection window 701. Then, the CPU of the client PC 12 controls the individual task list window 703 to display individual task icons. In the present exemplary embodiment, only two tasks of "enciphering" and "searchable" are displayed.

Then, a user can drag desirable common task icon(s) and individual task icon(s) from the common task list window 702 or the individual task list window 703 into the job flow display and edit window 704. Then, the CPU of the client PC 12 creates job flow definition information based on the dragged icon(s).

Next, the present exemplary embodiment performs the settings of "print processing device A dedicated job flow."

When a user selects a "print processing device A" 1102 in the print processing device selection window 701, the CPU of the client PC 12 displays a confirmation dialog 1103. The confirmation dialog 1103 enables a user to add desirable task(s) available when the job flow of a high-function apparatus is created based on the job flow of a low-function apparatus.

More specifically, as shown in FIG. 8, the print processing device B can perform the "enciphering" and "searchable" tasks belonging to the task group "PDF" and the print processing device A can perform the "high-compression PDF", "enciphering", and "searchable" tasks. Therefore, the present exemplary embodiment automatically creates a "print processing device A dedicated job flow" based on the "print processing device B dedicated job flow" in the following manner.

Two tasks "enciphering" and "searchable" classified into the "PDF" group in the "print processing device B dedicated job flow" are replaced with a corresponding individual task ("enciphering" and "searchable") for the print processing device A.

In this case, the CPU of the client PC 12 displays the confirmation dialog 1103 to ask a user to determine whether the "high-compression PDF" task should be automatically incorporated into the "print processing device A dedicated job flow." For example, the confirmation dialog 1103 includes a radio button 1104 that can indicate a usable task name.

When an OK button 1105 is clicked by a user, the CPU of the client PC 12 determines whether a "high-compression PDF" task should be incorporated into an automatically produced job flow based on the selection of the radio button 1104.

When plural functions are available, i.e., when plural radio buttons 1104 are displayed, a user can click an all-selection button 1106 or an all-cancel button 1107 to select or cancel all of the indicated tasks by one click motion.

When a user selects the "high-compression PDF" button 1104 and clicks the OK button 1105 on the confirmation dialog 1103, the CPU of the client PC 12 produces the job flow definition information including the "high-compression PDF" task for the print processing device A (refer to 1108).

On the other hand, when a user clicks the OK button 1105 without selecting the "high-compression PDF" button 1104 on the confirmation dialog 1103, the CPU of the client PC 12 produces the job flow definition information not including the "high-compression PDF" task for the print processing device A (refer to 1109).

Next, the job flow edit processing performed by the client PC 12 will be described with reference to the flowchart shown in FIG. 15.

<Job Flow Edit Processing>

FIG. 15 is a flowchart showing an example of a third control processing procedure performed by the cooperative task processing system in accordance with an exemplary embodiment, which corresponds to the job flow edit processing. The processing of the flowchart can be realized by the CPU of the client PC 12 that can load the program from the external storage device into the RAM and execute the program.

First, in step S1801, the CPU of the client PC 12 determines whether another print processing device is selected. For example, the CPU of the client PC 12 determines whether the print processing device A 1102 is selected in the print processing device selection window 701 of FIG. 14, when the print processing device B 1101 is currently selected.

When another print processing device is selected in step S1801, the processing flow proceeds to step S1808.

On the other hand, when another print processing device is not selected in step S1801, the processing flow proceeds to step S1802.

In step S1802, the CPU of the client PC 12 checks functional differences between the print processing devices. For example, when the print processing device A is newly selected in the condition that the print processing device B is currently selected, the CPU of the client PC 12 can confirm based on the information shown in FIG. 8 that the print processing device A can perform the "high-compression PDF" processing. In other words, the CPU of the client PC 12 can confirm the presence of any functional difference.

Next, in step S1803, the CPU of the client PC 12 determines whether there is any difference based on the check result obtained in step S1802.

When there is any functional difference in step S1803, the processing flow proceeds to step S1804 in which the display unit of the client PC 12 displays the confirmation screen 1103 shown in FIG. 14.

Next, in step S1805, the CPU of the client PC 12 determines whether the function button 1104 is selected and the OK button 1105 is pressed. For example, the CPU of the client PC 12 determines whether the "high-compression PDF" function is selected and the OK button 1105 is pressed.

Then, when the function button 1104 is selected and the OK button 1105 is pressed in step S1805, the processing flow proceeds to step S1806. In step S1806, the CPU of the client PC 12 causes the display unit to display the screen 1108 shown in FIG. 14 based on order dependence information shown in FIG. 16. Then, the CPU of the client PC 12 terminates the processing of this routine.

On the other hand, when the OK button 1105 is pressed without selecting any function in step S1805, the processing flow proceeds to step S1807, in which the CPU of the client PC 12 causes the display unit to display the screen 1109 shown in FIG. 14. Then, the CPU of the client PC 12 terminates the processing of this routine.

Furthermore, when no difference is detected in step S1803, the processing flow proceeds to step S1807, in which the CPU of the client PC 12 causes the display unit to display the screen 1109 shown in FIG. 14.

In the present exemplary embodiment, the user confirmation screen 1103 is displayed. However, without displaying the user confirmation screen 1103, it is possible to automatically display the screen 1108 or 1109 shown in FIG. 14 based on the functional differences.

Furthermore, user's preference can be taken into consideration to determine whether the user confirmation screen 1103 should be displayed before displaying the screen 1108 or 1109. The selection made by a user can be stored in the external storage device of the client PC 12.

The present exemplary embodiment displays a dialog in the process of automatically creating the job flow for a high-function apparatus, to let a user determine whether each executable task should be automatically added. In the present exemplary embodiment, the method for instructing the presence of added task(s) is not limited. For example, the task definition information can include the information instructing the presence of added task(s).

FIG. 16 is a view showing an exemplary list format of the task definition information according to the present exemplary embodiment.

The exemplary list format of FIG. 16 includes the task definition information (refer to 1201), so that the default operation can be automatically performed.

Furthermore, the present exemplary embodiment does not limit the position where each executable icon is inserted. For example, the task definition information can include order dependence information indicating the order among tasks (refer to 1202 of FIG. 16), and each executable icon can be inserted to an optimized position based on the order dependence information. Alternatively, a dialog can be displayed to let a user select the position where each executable icon is inserted.

As described above, the present exemplary embodiment can automatically create the job flow of each task processing device based on the job flow of another task processing device. Therefore, the cooperative job flow including the job flows of plural printing apparatuses can be easily created.

When the job flow of a high-function apparatus is created based on the job flow of a low-function apparatus, the present exemplary embodiment enables a user to determine whether any executable task should be automatically added. Thus, the cooperative job flow can be easily created.

THIRD EXEMPLARY EMBODIMENT

According to the above-described first and second exemplary embodiments, the job flow of a task processing device can be automatically created based on the job flow of another task processing devices. The third exemplary embodiment is characterized in that the job flows of plural task processing devices defined in the job flow definition information can be simultaneously viewed and edited.

Figure 17:
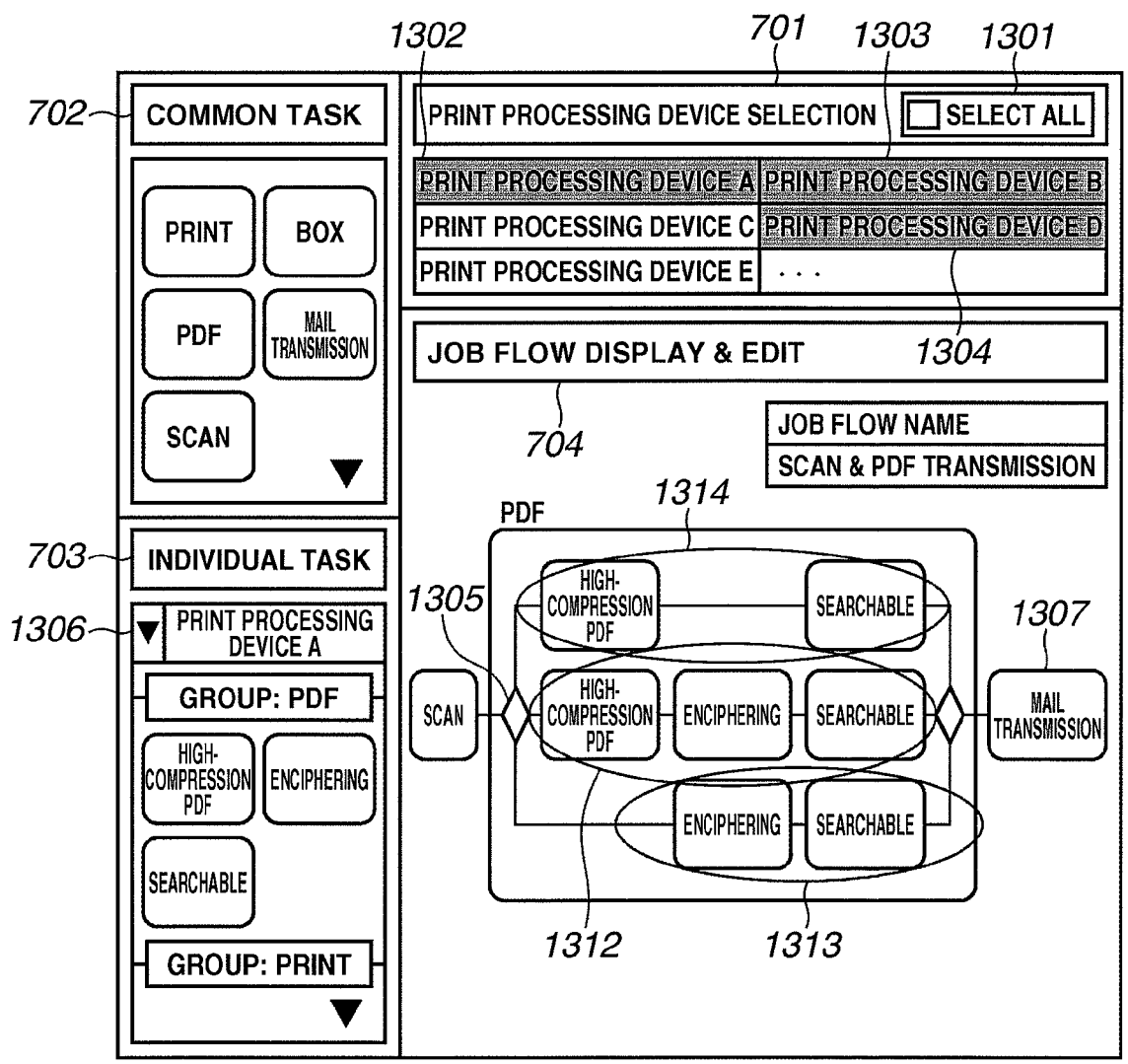
FIG. 17 is a view illustrating an exemplary editor screen that enables a user to simultaneously view and edit job flows of plural task processing devices in accordance with the second exemplary embodiment.

FIG. 17 is a view illustrating an exemplary editor screen that enables a user to simultaneously view and edit the job flows of plural task processing devices in accordance with the second exemplary embodiment.

The exemplary editor screen shown in FIG. 17 includes an "all-selection" button 1301. When a user puts a check mark in the "all-selection" button 1301, the user can simultaneously view all of the settings of individual task processing devices in the currently edited job flow definition (e.g., the job flow of "scan and PDF transmission").

In the present exemplary embodiment, the job flows of the print processing device A, the print processing device B, and the print processing device D are already set.

The CPU of the client PC 12 controls the print processing device selection window 701 to highlight the portions 1302, 1303, and 1304 corresponds to the task processing devices A, B, and D.

For example, a job flow portion 1312 corresponds to the print processing device A. The window portion 1302 and corresponding icons of the job flow portion 1312 can be displayed with blue background. Furthermore, a job flow portion 1313 corresponds to the print processing device B. The window portion 1303 and icons of the job flow portion 1313 can be displayed with yellow background. Furthermore, a job portion 1314 corresponds to the print processing device D. The window portion 1304 and icons of the job flow portion 1314 can be displayed with red background.

Furthermore, the CPU of the client PC 12 controls the job flow display and edit window 704 to display the job flow currently set in such a manner that the job flow of each task processing device can be viewed at a glance. More specifically, a branch icon 1305 assembles the job flows of the print processing device A, the print processing device B, and the print processing device D.

Furthermore, a combo box 1306 in the individual task list window 703 enables a user to select a desirable task processing device under the condition that the "all-selection" button 1301 is selected. Under the control of the CPU of the client PC 12, a user can edit the job flow settings of a task processing device designated in the combo box 1306 while viewing the job flows of other task processing devices set in the job flow definition information.

In this case, the CPU of the client PC 12 can highlight the job flow of a task processing device to be edited, as shown in a portion 1307. It is also possible to change the color of the edit target job flow. Alternatively, a bold frame can be used to display the edit target job flow. On the contrary, job flows other than the job flow of a task processing device to be edited can be displayed with gray background.

In the present exemplary embodiment, the flow of each task processing device defined in the job flow definition information can be displayed with a different color. However, it is possible to directly display the name of each task processing device in the job flow display and edit window 704.

As described above, the present exemplary embodiment enables a user to simultaneously view all of the job flows of individual task processing devices involved in the cooperative job flow. Thus, when a user creates a cooperative job flow, the user can easily check the portion dependent on the machine type of individual task processing device in the cooperative job flow.

According to the above-described first to third exemplary embodiments, the print processing device selection window 701 is provided on the editor screen to select task processing devices constituting the job flow to be created.

It is also possible to modify the print processing device selection window 701 so as to enable a user to select machine types of the task processing devices constituting the job flow to be created.

Furthermore, in each of the above-described exemplary embodiments, the management server 11 manages the tasks executable in each task processing device and the cooperative job flow definition information. However, the management server 11 can be omitted, if the client PC 12 sends a request to each task processing device and obtains the information relating to the executable tasks from each task processing device.

Furthermore, the client PC 12 can store, in its storage apparatus, the information relating to the tasks executable in each task processing device. Furthermore, the client PC 12 can transmit the created cooperative job flow definition information to each task processing device, and each task processing device can store the cooperative job flow definition information in its hard disk. Thus, a system not including the management server 11 can bring a similar effects.

Furthermore, when the client PC 12 is not available, the processing of the steps S501, S506, and S509-S514 shown in FIGS. 7A and 7B can be executed in the task processing device, such as the print processing device A 16 or the print processing device B 17.

The above-described exemplary embodiment can create an optimized cooperative job flow incorporating a plurality of job flows of print processing devices or other task processing devices. Furthermore, one cooperative job flow can describe common settings applicable to plural task processing devices and usable among different task processing devices. It is, therefore, unnecessary to create plural cooperative job flows considering the functional differences of individual task processing devices. Therefore, the management cost can be reduced and the usability can be improved.

Furthermore, a cooperative job flow including flows of plural task apparatuses can be easily created by automatically creating the flow of each task processing device based on the flow of another task processing device.

Furthermore, the above-described exemplary embodiment enables a user to simultaneously view all job flows of the task processing devices involved in the cooperative job flow. Thus, when a user creates a cooperative job flow, the user can easily check the portion dependent on the machine type of individual task processing device in the cooperative job flow.

Accordingly, the above-described exemplary embodiment can provide a mechanism enabling a user to easily create and view a job flow while surely confirming a portion dependent on the machine type when the job flow is commonly usable among different types of devices. Thus, the above-described exemplary embodiment can realize a network system including plural devices having various functions and mutually connected via a network, in which a cooperative job flow commonly usable among the plural devices can be easily created and processed.

FOURTH EXEMPLARY EMBODIMENT

According to the above-described first to third exemplary embodiments, the job flow involves the job flow dedicated to an individual device (i.e., the job flow including a portion dependent on the machine type). The fourth exemplary embodiment is characterized in that the management server 11 prepares a fundamental job flow having no machine type dependence and information required to construct a job flow dedicated to an individual device (i.e., job flow conversion information). Then, the fourth exemplary embodiment enables a user to flexibly convert the fundamental job flow into a job flow dedicated to an individual device based on the job flow conversion information.

The fourth exemplary embodiment is substantially identical to the above-described first to third exemplary embodiments in the entire arrangement of a cooperative task processing system as well as in the arrangement of individual apparatuses constituting the cooperative task processing system.

In the present exemplary embodiment, the management server 11 shown in FIG. 1 can store a fundamental job flow having no machine type dependence and job conversion information. The job flow conversion information will be described later. Furthermore, in the present exemplary embodiment, the method for storing the job flow conversion information is not limited. For example, the job flow conversion information can be stored in any server other than the management server 11.

<Task Definition Information>

Figure 18:
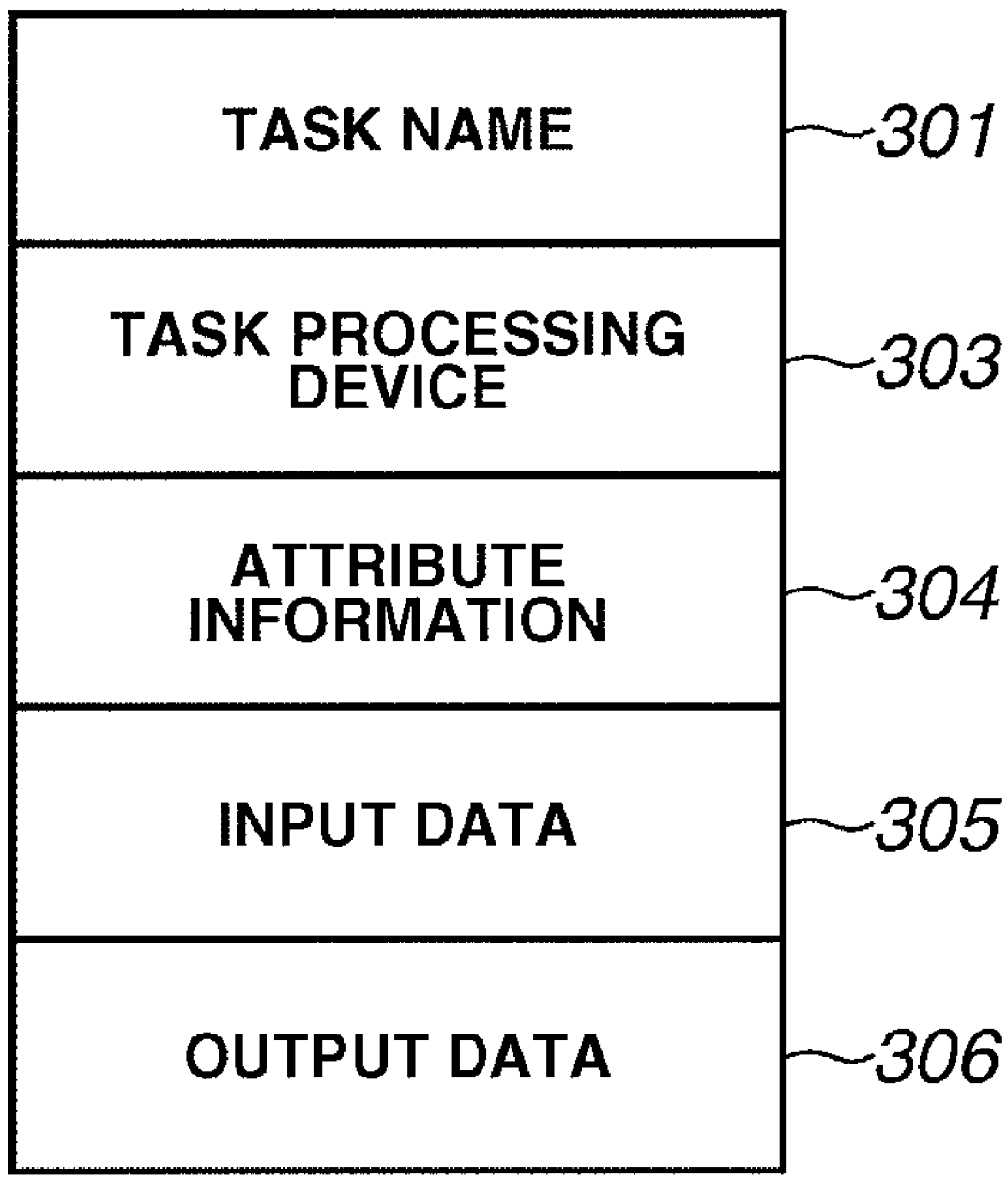
FIG. 18 is a view showing exemplary task definition information in accordance with a fourth exemplary embodiment.

FIG. 18 shows exemplary task definition information in accordance with the fourth exemplary embodiment.

As shown in FIG. 18, the exemplary task definition information according to the present exemplary embodiment includes information relating to task name 301, task processing device 303, attribute information 304, input data 305, and output data 306.

The task processing device 303 is information indicating a task processing device that can executes the task. The attribute information 304 is attribute information required when the task is executed. The input data 305 is input data required when the task is executed. The output data 306 is output data outputted after the task is executed. The format for describing the task definition information is not limited.

<Job Flow Definition Information>

Exemplary job flow definition information according to the fourth exemplary embodiment will be described below with reference to FIG. 19A and FIG. 19B.

Figures 19A, 19B:
FIG. 19A is an exemplary job flow for describing job flow definition information in accordance with the fourth exemplary embodiment.
FIG. 19B is a view showing an XML format of the job flow definition information shown in FIG. 19A.

FIG. 19A is a diagram illustrating an exemplary job flow for describing the job flow definition information in accordance with the fourth exemplary embodiment. The management server 11 can store the job flow definition information in its external storage device and can manage the job flow definition information.

According to the exemplary job flow shown in FIG. 19A, task 1 is first executed, then task 2 is executed, and finally task 3 is executed.

FIG. 19B shows an XML format of the job flow definition information shown in FIG. 19A. In the present exemplary embodiment, the job flow definition information has no machine type dependence.

In the present exemplary embodiment, to define a job flow, the XML format includes a <jobflow> tag, in which a number identifying the flow definition information is described as "id" attribute and a number identifying the job flow conversion information related to the job flow definition information is described as "rule-id" attribute. The example of FIG. 19B includes the description of <jobflow id="1" rule-id="1">.

Next, to define the execution order of tasks, a <task> tag for each task is prepared in the <jobflow> tag to describe the information relating to each task to be executed (i.e., job flow information). The example of FIG. 19B includes <task1>, <task2>, and <task3> tags. Each <task> tag defines the name of a task to be executed as "name" attribute.

The above-described definition is described for each task defined in the job flow. The example of FIG. 19B includes the description of <task1 name="SCAN"/><task2 name="PDF"/><task3 name="MAIL"/>.

Namely, the example of FIG. 19B defines a job flow including the scan processing performed as task 1, PDF processing performed as task 2, and mail transmission processing performed as task 3.

The description of the job flow definition information is not limited to the XML format. Any other format capable of identifying the order of tasks, contents of each job flow, and job flow conversion information can be used.

<Job Flow Conversion Information>

The job flow conversion information according to the fourth exemplary embodiment will be described below with reference to FIGS. 20A, 20B, and 20C.

FIG. 20A illustrates an exemplary arrangement of the job flow conversion information in accordance with the fourth exemplary embodiment.

As shown in FIG. 20A, the job flow conversion information includes a device information area 2001 and a conversion rule area 2002. The management server 11 can store the job flow conversion information in its storage device and can manage the job flow conversion information.

FIG. 20B shows an example of the device information area 2001 shown in FIG. 20A.

The device information area 2001 lists the functions of each device.

As shown in FIG. 20B, the device information area 2001 can be identified by a <devices> tag. The <devices> tag includes a <device> tag for each device, and the <device> tag includes "spec-id" attribute that identifies the device.

A <function> tag represents each function of the device. The <function> tag includes "name" attribute representing the name of each function of the device.

For example, "impl" attribute represents whether the function designated by the "name" attribute is actually installed. When the "impl" attribute is "true", it means that the function indicated by the "name" attribute is not installed.

The example of FIG. 20B includes the description of <device spec-id="1111111"> <function name="PDF" impl="true"> - - - </device>, according to which the "PDF" function is not installed in the device "1111111."

Furthermore, the <function> tag can include the description expressed in a nested pattern (i.e., in a hierarchical structure), according to which a function indicated by a child (lower layer) <function> tag represents an extended function of the function indicated by its parent (upper layer) <function> tag.

According to the example shown in FIG. 20B, a "Comp PDF" function of the device 1111111 is an extended function of the "PDF" function.

FIG. 20C shows an example of the conversion rule area 2002 shown in FIG. 20A.

As shown in FIG. 20C, the conversion rule area 2002 can be identified by a <rules> tag. The <rules> tag includes a <rule> tag for each rule.

The <rule> tag includes "rule-id" attribute which represents a unique ID defined in the system and used to discriminate the rule. The example shown in FIG. 20C includes "rule-id" attribute of <rule rule-id="1">. A "rule-id" attribute value shown in FIG. 20C corresponds to a "rule-id" attribute value of the <jobflow> tag of the job flow definition information shown in FIG. 19B.

Furthermore, a <device> tag lists the conversion rule of each device. The <device> tag includes "spec-id" attribute that can identify each device.

A <change> tag represents the conversion rule. The <change> tag includes "from" attribute representing an object device function to be converted and "to" attribute representing a target function obtained as a result of conversion. More specifically, the conversion rule is conversion information for each device applied when device independent job flow definition information is converted into device dependent job flow definition information.

The example of FIG. 20C includes the description of "<rule rule-id="1"> <change from="PDF" to="Comp PDF"/> - - - </rule>", which defines the rule that the "PDF" function is converted into the "Comp PDF" function when the job flow is used in the device 1111111.

<Exemplary Flowchart>

Figure 21:
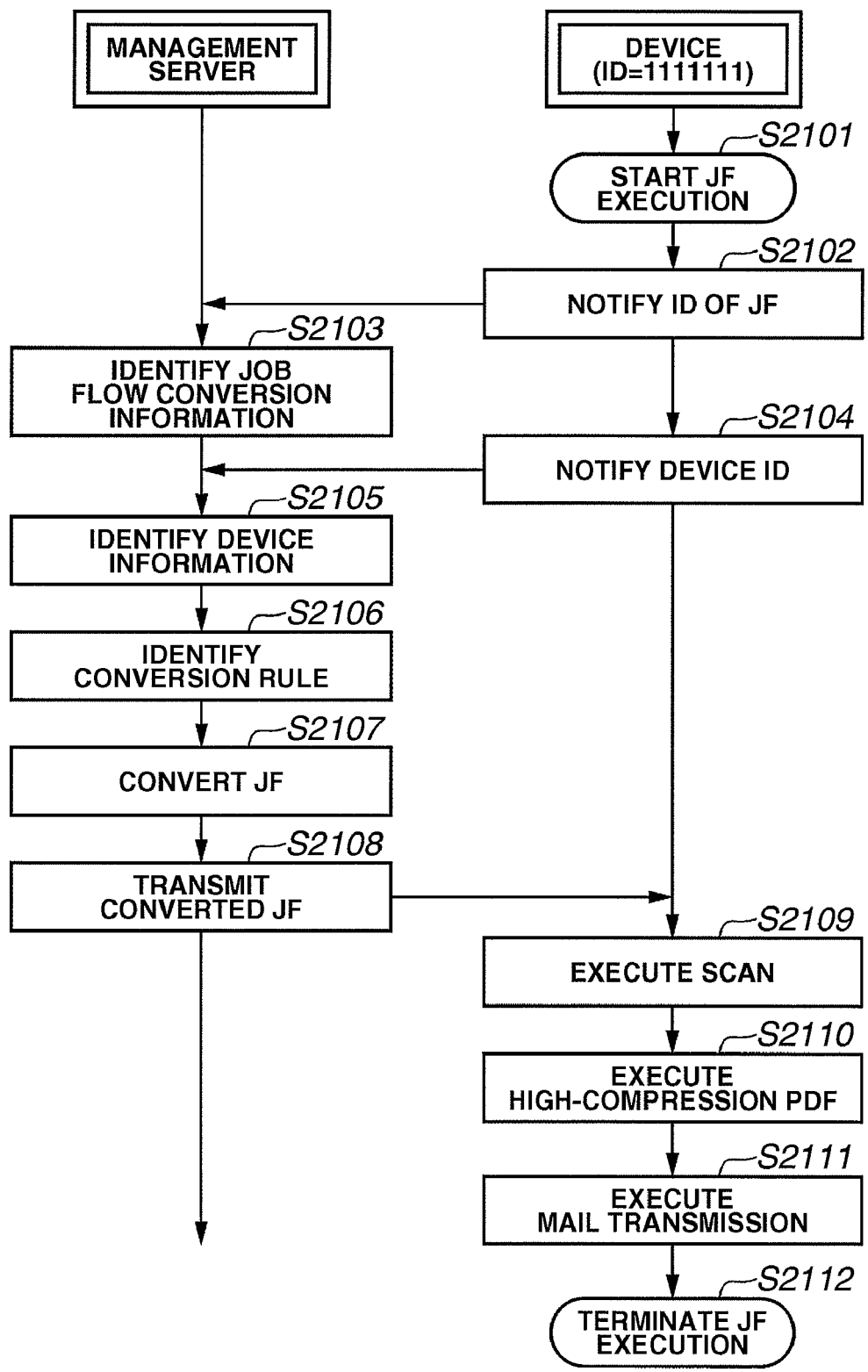
FIG. 21 is a flowchart showing an example of a fourth control processing procedure performed by the cooperative task processing system in accordance with an exemplary embodiment.

FIG. 21 is a flowchart showing an example of a fourth control processing procedure performed by the cooperative task processing system in accordance with an exemplary embodiment, corresponding to the processing of the device 1111111 that executes the job flow.

In FIG. 21, the processing of steps S2101, S2102, S2104, and S2109-S2112 corresponds to the processing performed in the task processing device (i.e., the print processing device A 16, or the print processing device B 17) functioning as the device 1111111. The processing can be realized by the CPU of the task processing device corresponding to the device 1111111 that can load the program from the ROM into the RAM and execute the program.

Furthermore, the processing of steps S2103, and S2105-S2108 corresponds to the processing performed in the management server 11. Furthermore, the processing can be realized by the CPU of the management server 11 that can load the program from the external storage device into the RAM and execute the program.

First, when a user designates a job flow on the operating section 209 of the device 1111111, the CPU of the device 1111111 starts execution of the job flow (refer to step S2101). In the present exemplary embodiment, the user designates the job flow definition information shown in FIG. 19B.

Next, in step S2102, the CPU of the device 1111111 notifies the management server 11 of an ID (i.e., "1") of the job flow definition information designated by the user.

In response to a notice of the job flow ID, the CPU of the management server 11 searches a job flow of a notified ID from its own database (e.g., an external storage device) storing registered job flow definition information and identifies the designated job flow definition information (refer to step S2103).

In the present exemplary embodiment, the job flow shown in FIG. 19B is identified. Furthermore, an appropriate method for searching a job flow can be used.

Next, in step S2104, the CPU of the device 1111111 notifies the management server 11 of a device ID of the device 1111111. According to the present exemplary embodiment, the device ID of the device 1111111 is "1111111."

In response to a notice of the device ID, the CPU of the management server 11 identifies device information defined in the device information area of the job flow conversion information based on the device ID of the device 1111111 (refer to step S2105). In the present exemplary embodiment, the management server 11 (i.e., its database (e.g., an external storage device)) stores the job flow conversion information including the device information area 2001 shown in FIG. 20B.

Next, in step S2106, the CPU of the management server 11 identifies the conversion rule defined in the conversion rule area 2002 of the job flow conversion information based on the device ID of the device 1111111. In the present exemplary embodiment, the management server 11 (i.e., its database (e.g., an external storage device)) stores the job flow conversion information including the conversion rule area 2002 shown in FIG. 20C.

Next, in step S2107, the CPU of the management server 11 performs the conversion of the job flow definition information identified in step S2103 with reference to the device information area 2001 identified in step S2105 and the conversion rule area 2002 identified in step S2106.

Figure 22:
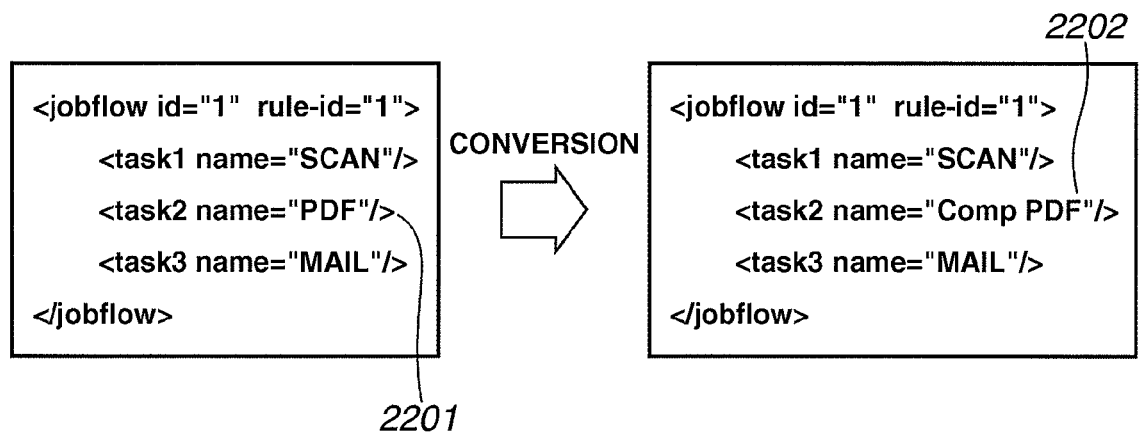
FIG. 22 is a view showing an example of the job flow definition information obtainable from the job flow conversion processing performed in step S2107.

FIG. 22 shows an example of the job flow definition information obtainable from the job flow conversion processing performed in step S2107.

FIG. 22 shows the result obtained by converting the job flow shown in FIG. 19B based on the conversion rule shown in FIG. 20C. More specifically, the "PDF" function of the task 2 is replaced with the "Comp PDF" function (refer to 2201 and 2202 in FIG. 22).

According to the present exemplary embodiment, the job flow definition information searched in step S2103 is not directly changed. More specifically, the management server 11 once copies the searched job flow definition information into the temporary region of the RAM and adds a change to the job flow definition information stored in the temporary region.

Next, in step S2108, the CPU of the management server 11 transmits the converted job flow definition information to the device 1111111.

The CPU of the device 1111111 receives the converted job flow definition information, and executes the job flow in steps S2109 through S2111 based on the converted job flow definition information.

First, in step S2109, the CPU of the device 1111111 executes a scan job ("SCAN").

Next, in step S2110, the CPU of the device 1111111 executes a high-compression PDF job ("Comp PDF"), as a result of the processing in step S2107 wherein the "PDF" function is converted into the "Comp PDF."

Next, in step S2111, the CPU of the device 1111111 executes a mail transmission job ("MAIL"). Then, in step S2112, the CPU of the device 1111111 terminates the processing of this routine.

Next, the processing for changing the device executing the job flow definition information to a device 2222222 will be described with reference to FIG. 23.

Figure 23:
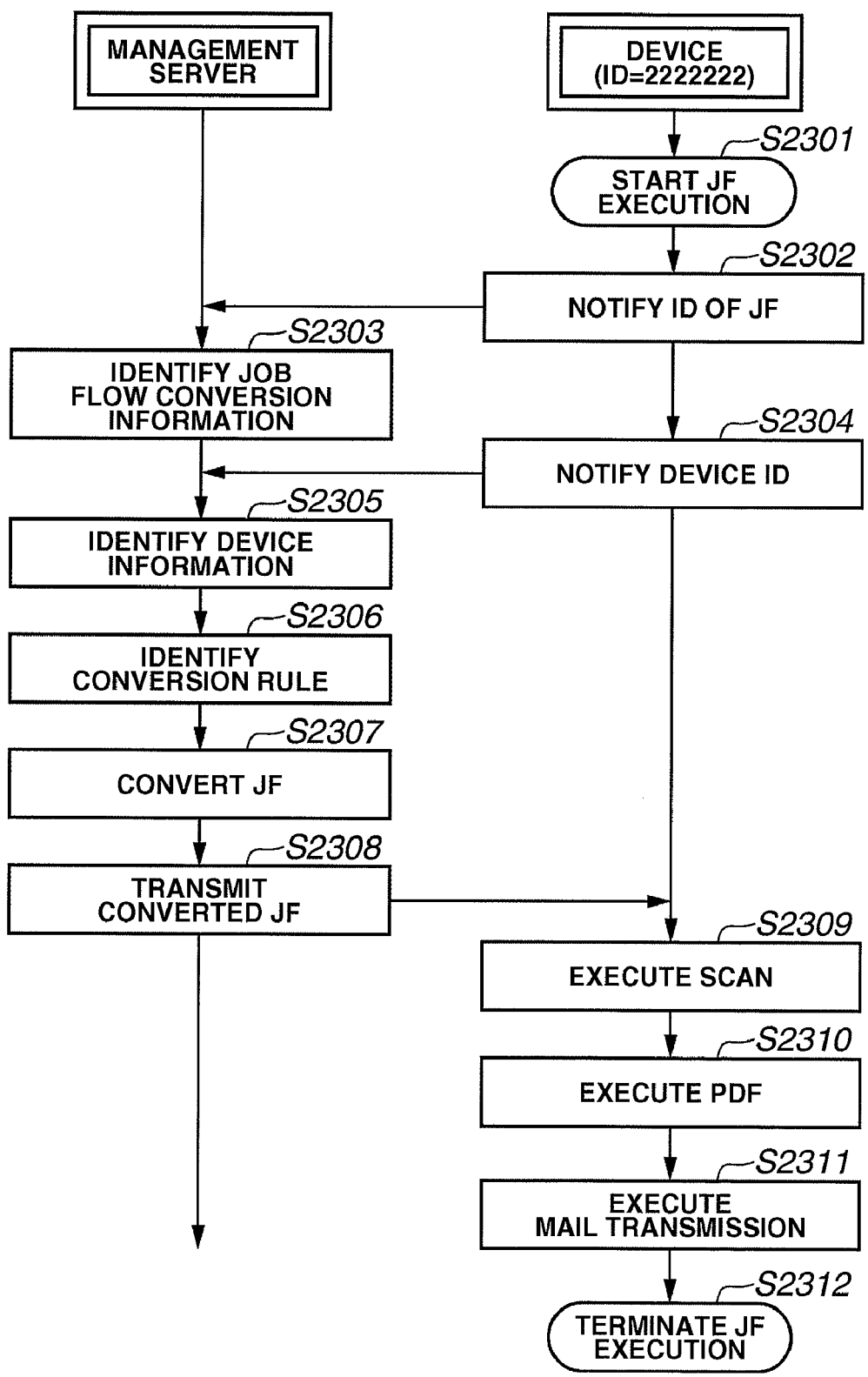
FIG. 23 is a flowchart showing an example of a fifth control processing procedure performed by the cooperative task processing system in accordance with an exemplary embodiment.

FIG. 23 is a flowchart showing an example of a fifth control processing procedure performed by the cooperative task processing system in accordance with an exemplary embodiment, corresponding to the processing of the device 2222222 that executes the job flow.

In FIG. 23, the processing of steps S2301, S2302, S2304, and S2309-S2312 corresponds to the processing performed in the task processing device (i.e., the print processing device A 16 or the print processing device B 17) functioning as the device 2222222. The processing can be realized by the CPU of the task processing device corresponding to the device 2222222 that can load the program from the ROM into the RAM and execute the program.

Furthermore, the processing of steps S2303 and S2305-S2308 corresponds to the processing performed in the management server 11. The processing can be realized by the CPU of the management server 11 that can load the program from the external storage device into the RAM and execute the program.

First, when a user designates a job flow on the operating section 209 of the device 2222222, the CPU of the device 2222222 starts execution of the job flow (refer to step S2301). In the present exemplary embodiment, the user designates the job flow definition information shown in FIG. 19B.

Next, in step S2302, the CPU of the device 2222222 notifies the management server 11 of an ID of the job flow definition information designated by the user.

In response to a notice of the job flow ID, the CPU of the management server 11 searches a job flow of a notified ID from its own database (e.g., an external storage device) storing registered job flow definition information and identifies the designated job flow definition information (refer to step S2303).

In the present exemplary embodiment, the job flow shown in FIG. 19B is identified. Furthermore, an appropriate method for searching a job flow can be used.

Next, in step S2304, the CPU of the device 2222222 notifies the management server 11 of a device ID of the device 2222222. According to the present exemplary embodiment, the device ID of the device 2222222 is "2222222."

In response to a notice of the device ID, the CPU of the management server 11 identifies device information defined in the device information area of the job flow conversion information based on the device ID of the device 2222222 (refer to step S2305). In the present exemplary embodiment, the management server 11 (i.e., its database (e.g., an external storage device)) stores the job flow conversion information including the device information area 2001 shown in FIG. 20B.

Next, in step S2306, the CPU of the management server 11 identifies the conversion rule defined in the conversion rule area 2002 of the job flow conversion information based on the device ID of the device 2222222. In the present exemplary embodiment, the management server 11 (i.e., its database (e.g., an external storage device)) stores the job flow conversion information including the conversion rule area 2002 shown in FIG. 20C.

Next, in step S2307, the CPU of the management server 11 performs the conversion of the job flow definition information identified in step S2303 with reference to the device information area 2001 identified in step S2305 and the conversion rule area 2002 identified in step S2306. In this case, the job flow shown in FIG. 19B is converted based on the conversion rule shown in FIG. 20C. As understood from FIG. 20B, the device 2222222 has no "Comp PDF" function.

Figure 24:
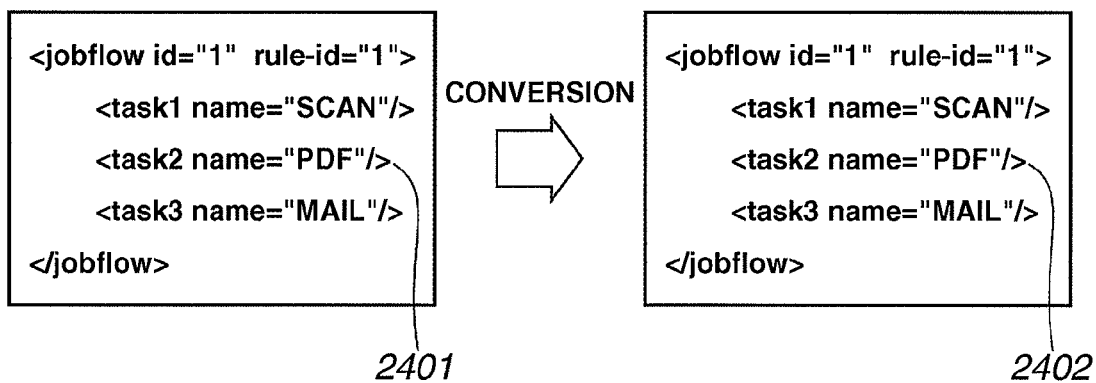
FIG. 24 is a view showing an example of execution result obtained from the job flow conversion processing performed in step S2307.

Therefore, the "PDF" function of the task 2 remains unchanged (refer to 2401 and 2402 in FIG. 24).

FIG. 24 shows an example of the job flow definition information obtainable from the job flow conversion processing performed in step S2307.

Next, in step S2308, the CPU of the management server 11 transmits the processed job flow definition information to the device 2222222.

The CPU of the device 2222222 receives the job flow definition information, and executes the job flow in steps S2309 through S2311 based on the job flow definition information.

First, in step S2309, the CPU of the device 2222222 executes a scan job ("SCAN"). Next, in step S2310, the CPU of the device 2222222 executes a PDF job ("PDF").

Namely, the device 2222222 executes the ordinary PDF job ("PDF"), unlike the device 1111111 that executes the high-compression PDF job ("Comp PDF") in (refer to step S2110 in FIG. 21).

Next, in step S2311, the CPU of the device 2222222 executes a mail transmission job ("MAIL"). Then, in step S2312, the CPU of the device 2222222 terminates the processing of this routine.

FIFTH EXEMPLARY EMBODIMENT

According to the above-described fourth exemplary embodiment, a job flow not depending on the machine type can be converted into a machine type dependent job flow based on job flow conversion information. The fifth exemplary embodiment provides a system capable of automatically changing the job flow conversion information when the function of individual device is changed or when a device is newly introduced.

In the present exemplary embodiment, a function is added to the job flow of the device 1111111 and to the device 2222222 in the following three (1st to 3rd) conditions.

1. Initial Condition
2. Addition of "Comp PDF" function to Device 1111111
3. Addition of "Comp PDF" function to Device 2222222

1. Initial Condition

FIG. 25 is a view illustrating a device information area and a conversion rule area on the management server 11 in the initial condition.

According to the example shown in FIG. 25, only the PDF function is executable in each of the device 1111111 and the device 2222222 and nothing is defined in the conversion rule with respect to the PDF function.

Figure 26:
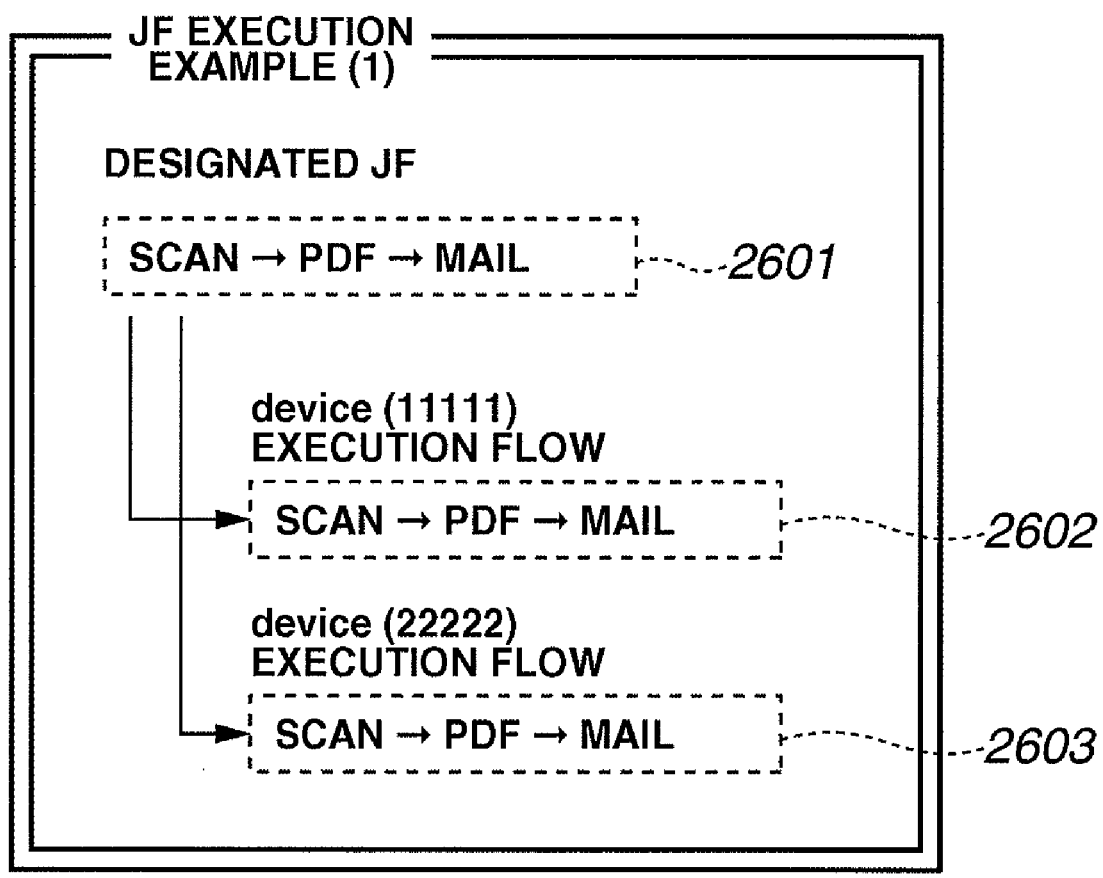
FIG. 26 is a view illustrating a job flow conversion operation performed when the job flow shown in FIG. 19B is executed by device 1111111 and device 2222222 in the initial condition.

FIG. 26 illustrates a job flow conversion operation performed when the job flow shown in FIG. 19B is executed by the device 1111111 and the device 2222222 in the initial condition.

As shown in FIG. 25, no conversion rule is defined for both of the device 1111111 and the device 2222222. Accordingly, according to the example shown in FIG. 26, both of the device 1111111 and the device 2222222 execute the ordinary PDF processing without performing any conversion (refer to 2601, 2602, and 2603).

2. Addition of "Comp PDF" Function to Device 1111111

FIG. 27 illustrates a device information area and a conversion rule area on the management server 11 in a condition where the "Comp PDF" function is newly applied to the device 1111111.

The device information area includes a definition relating to the "Comp PDF" function (i.e., <function name="Comp PDF" impl="true"/>) newly applied to the device 1111111 (refer to 2701 in FIG. 27).

Furthermore, the device information area includes another definition indicating that the "Comp PDF" function is not install (i.e., <function> tag <function name="Comp PDF" impl="false"/>) newly applied to the device 2222222 (refer to 2702).

The conversion rule area includes a rule instructing conversion of the "PDF" function into the "Comp PDF" function (i.e., <change from="PDF" to="Comp PDF"/>) newly applied to the device 1111111 (refer to 2703).

Furthermore, the conversion rule area includes another rule instructing conversion of the "Comp PDF" function into the "PDF" function (i.e., <change from="Comp PDF" to="PDF"/>) newly applied to the device 2222222 (refer to 2704). The rules 2703 and 2704 are added based on the information added in the device information area.

Figure 28:
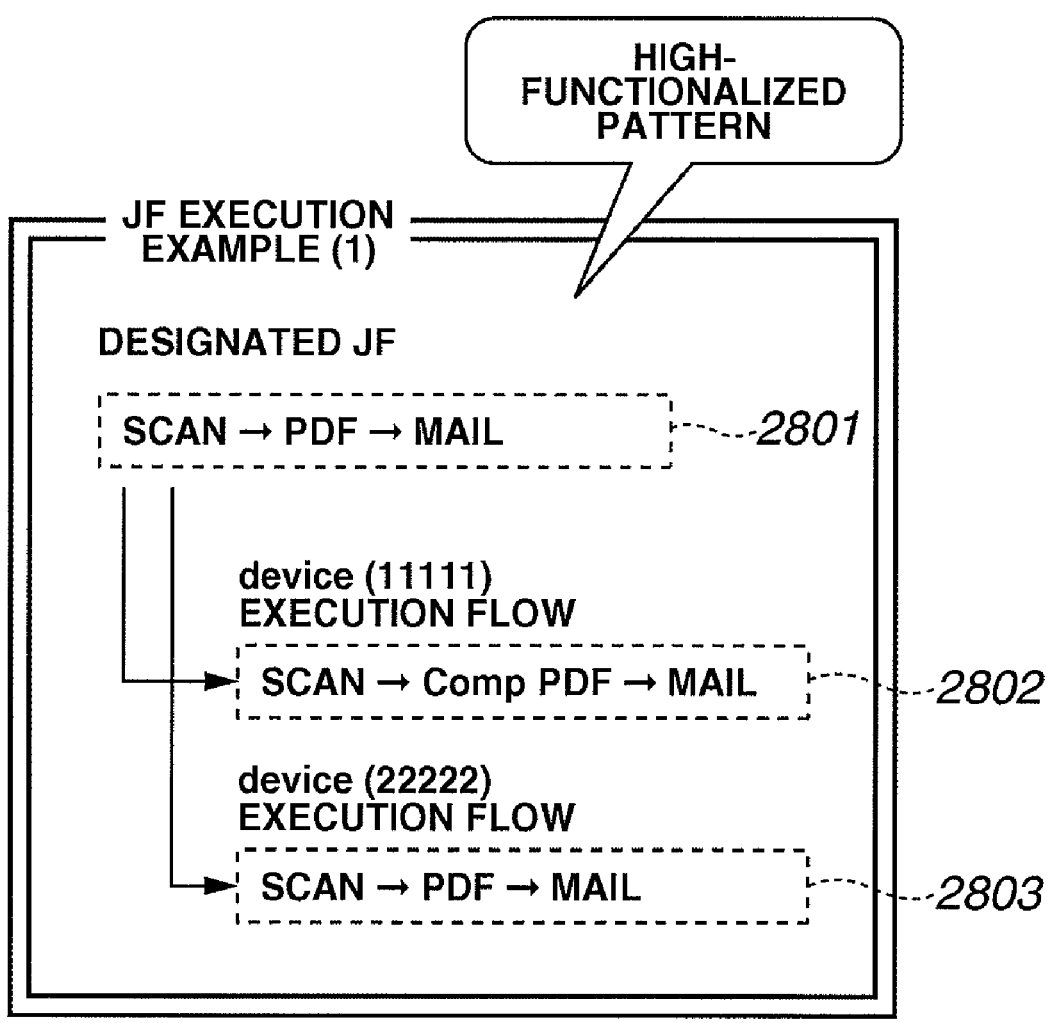
FIG. 28 is a view illustrating a job flow conversion operation performed when the job flow shown in FIG. 19B is executed by the device 1111111 and the device 2222222 in the condition where the "Comp PDF" function is newly applied to the device 1111111.

FIG. 28 is a view illustrating a job flow conversion operation performed when the job flow shown in FIG. 19B is executed by the device 1111111 and the device 2222222 in the condition where the "Comp PDF" function is newly applied to the device 1111111.

The job flow of each device is converted and executed based on the information of the conversion rule area shown in FIG. 27 (refer to 2801, 2802, and 2803 of FIG. 28). More specifically, the "PDF" function is converted into the "Comp PDF" function in the job flow of the device 1111111 (refer to 2802). On the other hand, the "PDF" function remains without any conversion in the job flow of the device 2222222 (refer to 2803).

Figures 29, 30:
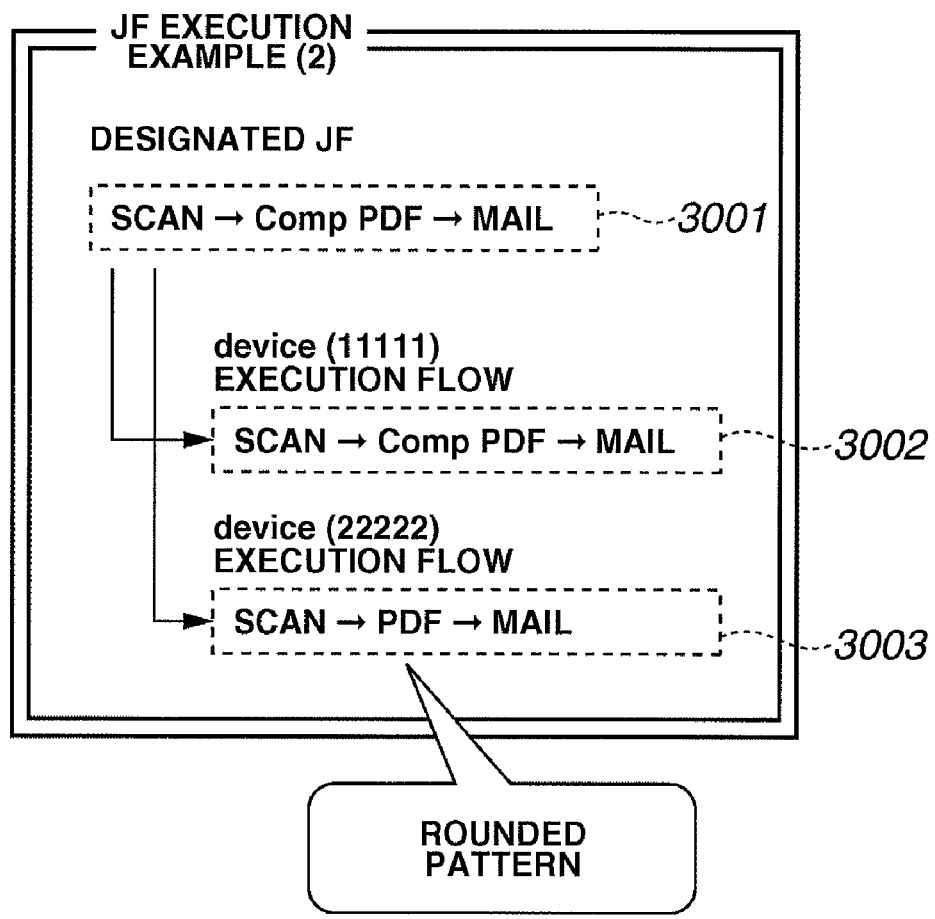
FIG. 29 is a view illustrating an exemplary job flow including a scan job (task 1), a high-compression PDF job (task 2), and a mail transmission job (task 3) which are performed in this order.
FIG. 30 is a view illustrating a job flow conversion operation performed when the job flow shown in FIG. 29 is executed by each device in the condition where the management server 11 manages the device information area and the conversion rule area shown in FIG. 27.

FIG. 29 illustrates an exemplary job flow including a scan job (task 1), a high-compression PDF job (task 2), and a mail transmission job (task 3) which are performed in this order.

FIG. 30 illustrates a job flow conversion operation performed when the job flow shown in FIG. 29 is executed by each device in the condition where the management server 11 manages the device information area and the conversion rule area shown in FIG. 27.

The job flow of each device is executed based on the information of the conversion rule area in FIG. 27. The device 1111111 executes the "Comp PDF" function without any conversion (refer to 3001 and 3002 in FIG. 30). On the other hand, the device 2222222 executes the "PDF" function converted (rounded) from the "Comp PDF" function (refer to 3001 and 3003 in FIG. 30).

3. Addition of "Comp PDF" Function to Device 2222222

FIG. 31 illustrates a device information area and a conversion rule area on the management server 11 in a condition where the "Comp PDF" function is applied to the device 2222222.

The device information area includes a <function> tag representing the definition of the "Comp PDF" function applied to the device 2222222, wherein the "impl" attribute value is changed from "false" to "true" (refer to 3101 in FIG. 31).

The conversion rule area includes a rule instructing conversion of the "PDF" function into the "Comp PDF" function which is applied to the device 2222222 (refer to 3102 in FIG. 31). Furthermore, the rule instructing conversion of the "Comp PDF" function into the "PDF" function (refer to 2704 in FIG. 27) is deleted and is not applied to the device 2222222.

Figure 32:
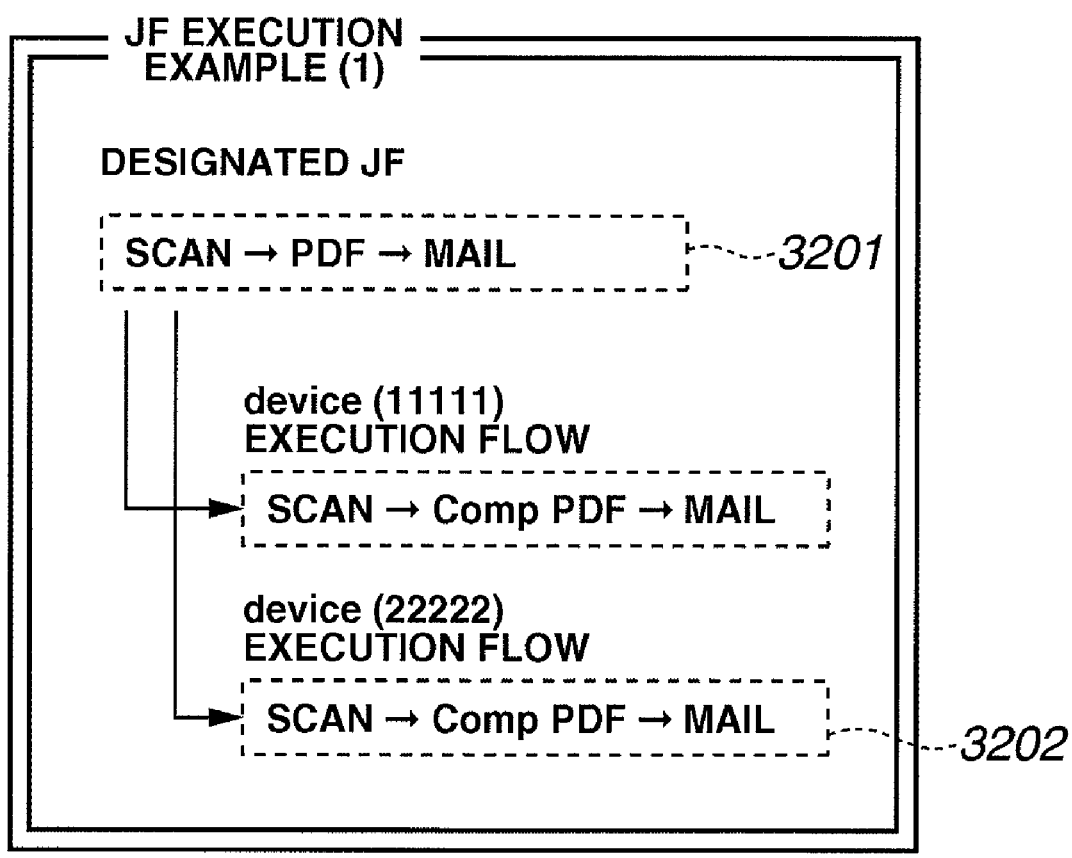
FIG. 32 is a view illustrating an operation performed when the job flow shown in FIG. 19B is executed by the device 1111111 and the device 2222222 in the condition where the management server 11 manages the device information area and the conversion rule area shown in FIG. 31.

FIG. 32 illustrates an operation performed when the job flow shown in FIG. 19B is executed by the device 1111111 and the device 2222222 in the condition where the management server 11 manages the device information area and the conversion rule area shown in FIG. 31.

The device 2222222 executes the "Comp PDF" function converted from the "PDF" function (refer to 3201 and 3202 in FIG. 32).

Next, the processing of the management server 11 that can change the device information area and the conversion rule area in response to addition of function(s) will be described with reference to the flowchart of FIG. 33.

Figure 33:
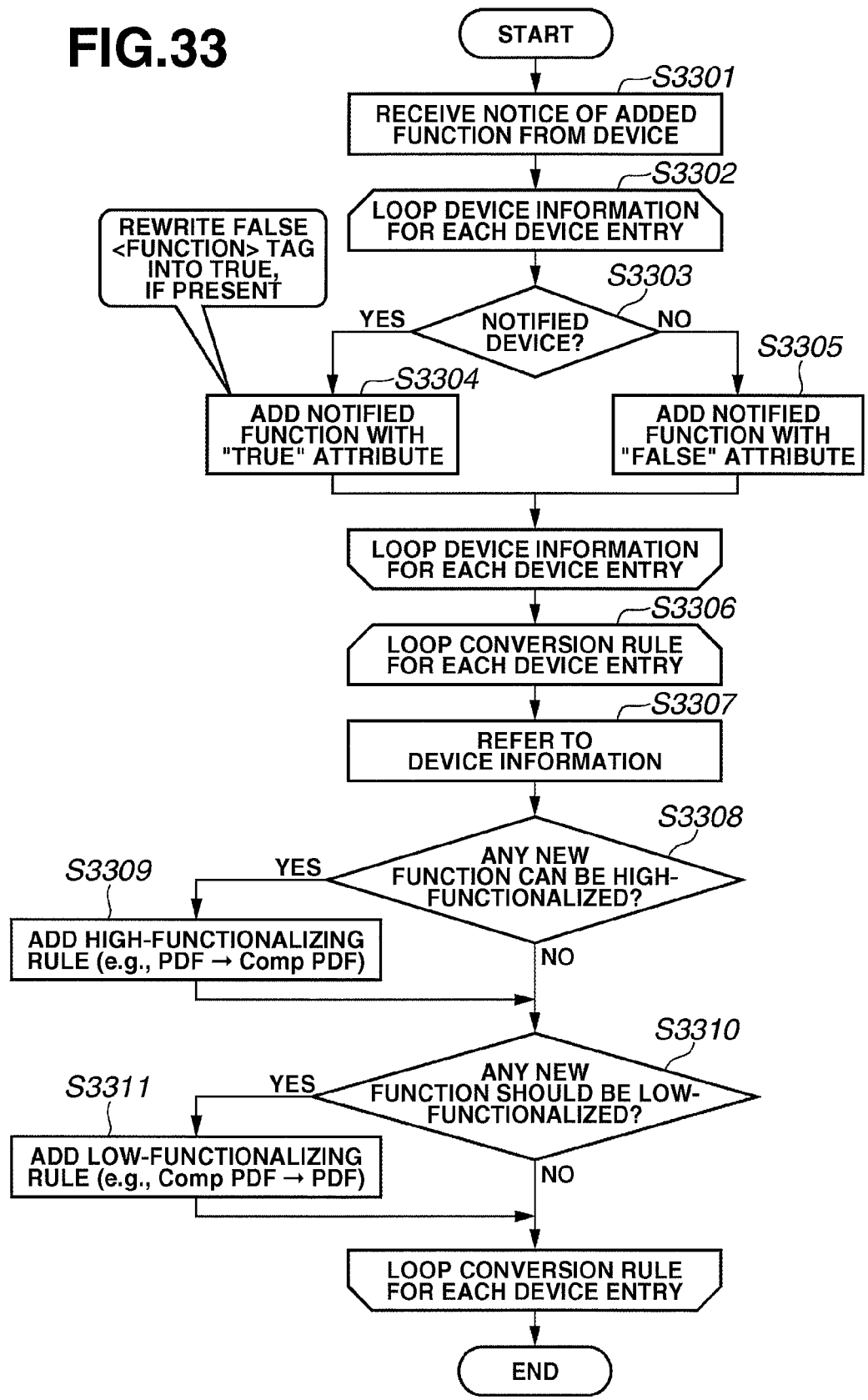
FIG. 33 is a flowchart showing an example of a sixth control processing procedure performed by the cooperative task processing system in accordance with an exemplary embodiment.

FIG. 33 is a flowchart showing an example of a sixth control processing procedure performed by the cooperative task processing system in accordance with an exemplary embodiment, which corresponds to the processing of the management server 11 that can change the device information area the and conversion rule area in response to addition of function(s). The processing of the present flowchart can be realized by the CPU of the management server 11 that can load the program from the external storage device into the RAM and execute the program.

First, in step S3301, the CPU of the management server 11 receives a notice of added function(s) from a device. In the present invention, the method for notify addition of function(s) is not limited.

Next, in step S3302, the CPU of the management server 11 obtains a "spec-id" attribute value of the <device> tag described in the device information area of the job flow conversion information stored in its own storage device (e.g., the external storage device 111). The CPU of the management server 11 repetitively executes the processing of step S3302 and succeeding steps S3303-S3305 for each <device> tag described in the device information area of the job flow conversion information.

In step S3303, the CPU of the management server 11 compares the "spec-id" attribute value obtained in step S3302 with a device ID value of the device that has transmitted the notice of added function(s) in step S3301.

When the "spec-id" attribute value obtained in step S3302 agrees with the device ID value of the device that has transmitted the notice of added function(s) (i.e., YES in step S3303), the processing flow proceeds to step S3304.

In step S3304, the CPU of the management server 11 adds a <function> tag of the notified function ("impl" attribute is "true") into a corresponding <device> tag of the device information area (e.g., refer to 2701 in FIG. 27). If the <function> tag of the notified function is already present and the "impl" attribute is "false", the CPU of the management server 11 rewrites the "impl" attribute to "true" (e.g., refer to 3101 in FIG. 31).

Furthermore, when the <function> tag of the notified function is already present and the "impl" attribute is "true", the CPU of the management server 11 performs nothing and terminates the processing of step S3304. Then, the processing flow returns to step S3302.

On the other hand, when the "spec-id" attribute value obtained in step S3302 disagrees with the device ID value of the device that has transmitted the notice of added function(s) (i.e., NO in step S3303), the processing flow proceeds to step S3305.

In step S3305, the CPU of the management server 11 adds a <function> tag of the notified function ("impl" attribute is "false") into a corresponding <device> tag of the device information area (e.g., refer to 2702 in FIG. 27). If the <function> tag of the notified function is already present and the "impl" attribute is "true", the CPU of the management server 11 rewrites the "impl" attribute to "false."

Furthermore, when the <function> tag of the notified function is already present and the "impl" attribute is "false", the CPU of the management server 11 performs nothing and terminates the processing of step S3305. Then, the processing flow returns to step S3302.

In this manner, the processing of steps S3302-S3305 is repetitively performed for each <device> tag to update the information of the device information area in individual register devices. After the processing of steps S3302-S3305 is accomplished for each <device> tag, the processing flow proceeds to step S3306.

Subsequently, in step S3306, the CPU of the management server 11 obtains a "spec-id" attribute value of the <device> tag described in the conversion rule area of the job flow conversion information stored in its own storage device. The CPU of the management server 11 repetitively executes the processing of step S3306 and succeeding steps S3307-S3311 for each <device> tag.

In step S3307, the CPU of the management server 11 searches the device information area to find a <device> tag having a "spec-id" attribute value identical to the "spec-id" attribute value described in the conversion rule area obtained in step S3306.

When there is no <device> tag having the same "spec-id" attribute value, the processing flow returns to step S3306. On the other hand, when any <device> tag having the same "spec-id" attribute value is present, the CPU of the management server 11 obtains the information of a corresponding <device> tag in the device information area.

Next, in step S3308, the CPU of the management server 11 determines whether a new function can be high-functionalized, based on the information of the <device> tag obtained in step S3307. In the present exemplary embodiment, the "high-functionalized" state is the condition where the <function> tag in the <device> tag has a hierarchical structure, and the "impl" attribute value of a child (lower layer) <function> tag is "true" (e.g., refer to 2701 in FIG. 27).

When the new function can be high-functionalized in step S3308, the CPU of the management server 11 adds a high-functionalizing rule into a conversion rule describing portion of the conversion rule area applied to the corresponding device (refer to step S3309).

In the present exemplary embodiment, the high-functionalizing rule can be represented by a <change> tag including a "from" attribute value as "name" attribute value of a parent (upper layer)<function> tag and a "to" attribute value as "name" attribute value of a child (lower layer) <function> tag.

When the same <change> tag is already present, the CPU of the management server 11 performs nothing. After accomplishing the processing of step S3308, the processing flow proceeds to step S3310.

On the other hand, when the new function cannot be high-functionalized in step S3308, the processing flow directly proceeds to step S3310.

In step S3310, the CPU of the management server 11 determines whether a new function should be low-functionalized, based on the information of the <device> tag obtained in step S3307. In the present exemplary embodiment, the "low-functionalized state is the condition where the <function> tag in the <device> tag has a hierarchical structure and the "impl" attribute value of a child (lower layer) <function> tag is "false" (e.g., refer to 2702 in FIG. 27).

When the new function should be low-functionalized in step S3310, the CPU of the management server 11 adds a low-functionalizing rule into a conversion rule describing portion of the conversion rule area applied to the corresponding device (refer to step S3311).

In the present exemplary embodiment, the low-functionalizing rule can be represented by a <change> tag including a "to" attribute value as "name" attribute value of a parent (upper layer) <function> tag and a "from" attribute value as "name" attribute value of a child (lower layer) <function> tag.

When the same <change> tag is already present, the CPU of the management server 11 performs nothing. After accomplishing the processing of step S3311, the processing flow proceeds to step S3306.

On the other hand, when the new function should not be low-functionalized in step S3310, the processing flow directly returns to step S3306.

In this manner, the processing of steps S3306-S3311 is repetitively performed for each <device> tag to update the information of the conversion rule area in individual register devices. After the processing of steps S3306-S3311 is accomplished for each <device> tag, the CPU of the management server 11 terminates the processing of this routine.

As described above, the fourth and fifth exemplary embodiments enables different task processing devices to use a common cooperative job flow, so that the functions of individual task processing devices can be effectively used.

Furthermore, each task processing device can use an optional function, if added, without modifying the job flow.

Furthermore, it is unnecessary to prepare a job flow dedicated to each task processing device.

Accordingly, the above-described exemplary embodiments can realize a flexible cooperative job flow execution environment in which a complicated work for changing all or most of the job flows is not required even when an optional function is added to the task processing device.

According to the above-described fourth and fifth exemplary embodiments, the management server 11 stores the information required to create a job flow dedicated to each device and a job flow dedicated to each device can be flexibly created in the execution of the job flow.

However, it is possible to modify the above-described exemplary embodiments in such a manner that the management server 11 can hold the information required to create a job flow dedicated to each machine type and a job flow dedicated to each machine type can be flexibly created in the execution of the job flow.

The above-described various data and the arrangement and contents of the editor screen are not limited and can be modified appropriately depending on the way of use or depending on the purpose of using this system.

The present invention can be embodied as a system, an apparatus, a method, a program or a storage medium. For example, the present invention can be applied to a system including plural devices or can be applied to a single device.

Exemplary memory maps of a storage medium that can store various data processing programs readable by individual devices 11-17 constituting the cooperative task processing system will be described with reference to memory maps of FIGS. 34A-34C.

Figure 34A:
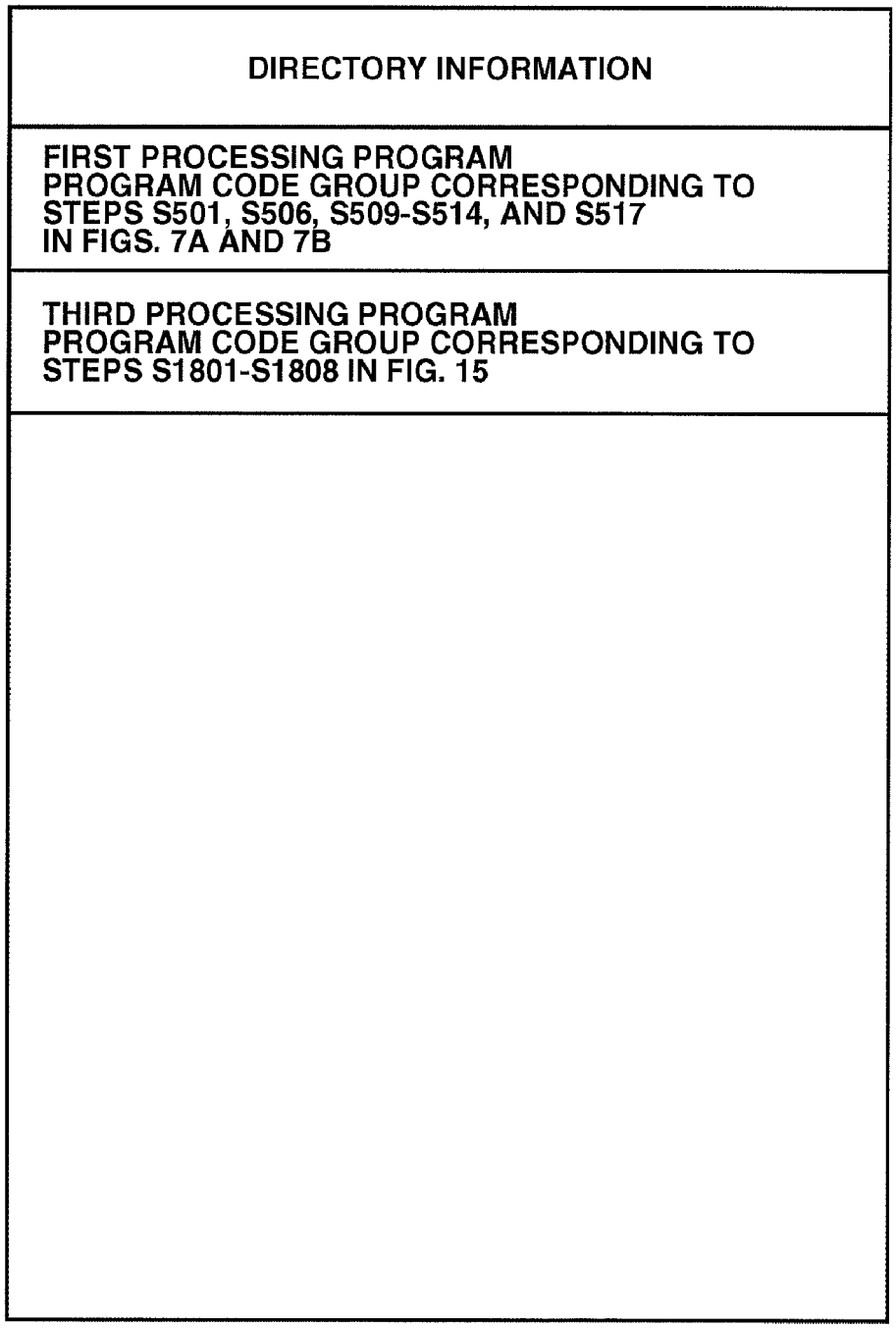
FIG. 34A is a view illustrating an exemplary memory map of a storage medium (or recording medium) that can store various data processing programs readable by the client PC of the cooperative task processing system according to an exemplary embodiment.

FIG. 34A illustrates an exemplary memory map of a storage medium (or recording medium) that can store various data processing programs readable by the client PC 12 of the cooperative task processing system according to an exemplary embodiment.

FIG. 34B illustrates an exemplary memory map of a storage medium (or recording medium) that can store various data processing programs readable by the management server 11 of the cooperative task processing system according to an exemplary embodiment.

FIG. 34C illustrates an exemplary memory map of a storage medium (or recording medium) that can store various data processing programs readable by the task processing devices 14-17 of the cooperative task processing system according to an exemplary embodiment.

Although not shown in the drawing, the storage medium can also store the information relating to management of program(s), such as version information and creator name, as well as the information relating to the OS that reads the program(s), such as icons discriminating the program(s).

Directories of the storage medium can manage the data belonging to various programs. Furthermore, the storage medium may store a program required for installing various programs on a computer as well as a program required for extracting compressed programs.

A host computer, when the programs are installable from an external storage device, can execute the processing of the exemplary embodiments shown in the flowcharts of FIGS. 7A, 7B, 12, 15, 21, 23, and 33. In such a case, the programs and related information can be supplied to an output apparatus using a storage medium (e.g., a CD-ROM, a flash memory, or a flexible disk (FD)), or via a network from an external storage medium.

Furthermore, software program code for realizing the functions of the above-described exemplary embodiments can be supplied, via a storage medium (or a recording medium), to a system or an apparatus. A computer (or CPU or MPU) in the system or the apparatus can read the program code stored in the storage medium and can execute the readout program.

In this case, the program code read out from the storage medium can realize the functions of the exemplary embodiments. The equivalents of programs can be used if they possess comparable functions. Accordingly, when the functions or processes of the exemplary embodiments are realized by a computer, program code installed in the computer and a recording medium storing the program are used to implement the present invention. In this case, the type of program can be any one of object code, interpreter program, and OS script data.

A recording medium supplying the program can be selected from any one of a flexible disk, a hard disk, an optical disk, a magneto-optical disk, an MO, a CD-ROM, a CD-R, a CD-RW, a magnetic tape, a nonvolatile memory card, a ROM, and a DVD (DVD-ROM, DVD-R). In other words, the present invention encompasses a computer program that can realize the functions or processes of the exemplary embodiments or any recording medium that can store the program.

The method for supplying the program includes accessing a home page on the Internet using the browsing function of a client computer, when the home page allows each user to download the computer program of the present invention, or compressed files of the programs having automatic installing functions, to a hard disk or other recording medium of the user.

Furthermore, the program code constituting the programs of the present invention can be divided into a plurality of files so that respective files are downloadable from different home pages. Namely, the present invention encompasses WWW servers or FTP servers that allow numerous users to download the program files so that the functions or processes of the present invention can be realized on their computers.

Furthermore, enciphering the programs of the present invention and storing the enciphered programs in a CD-ROM or comparable recording medium is a practical method when the programs of the present invention are distributed to the users. The authorized users (i.e., users satisfying predetermined conditions) are allowed to download key information from a home page on the Internet. The users can decipher the programs with the obtained key information and can install the programs on their computers. When the computer reads and executes the installed programs, the functions of the above-described exemplary embodiments can be realized.

Furthermore, not only the functions of the above-described exemplary embodiment can be realized by a computer that executes the programs, but also an operating system (OS) running on the computer can execute part or all of the actual processing based on instructions of the programs.

Furthermore, the program code read out of a storage medium can be written into a memory of a function expansion board equipped in a computer or into a memory of a function expansion unit connected to the computer. In this case, based on an instruction of the program, a CPU provided on the function expansion board or the function expansion unit can execute part or all of the processing so that the functions of the above-described exemplary embodiments can be realized.

The present invention can be applied to a system including plural devices or can be applied to a single apparatus. Moreover, the present invention can be realized by supplying the program(s) to a system or an apparatus. In this case, the system or the apparatus can read the software program relating to the present invention from a storage medium.

The exemplary embodiments of the present invention can create an cooperative job flow optimized for each task processing device. Furthermore, one cooperative job flow can describe common settings applicable to plural task processing devices and usable among different task processing devices. It is, therefore, unnecessary to create plural cooperative job flows considering the functional differences of individual task processing devices. Therefore, the management cost can be reduced and the usability can be improved.

Furthermore, the exemplary embodiments of the present invention can automatically create the job flow of a task processing device based on the job flow of another task processing devices. Therefore, the cooperative job flow including the job flows of plural printing apparatuses can be easily created.

Furthermore, the exemplary embodiments of the present invention enable a user to simultaneously view all of the job flows of the task processing devices involved in the cooperative job flow. Thus, when a user creates a cooperative job flow, the user can easily check the portion dependent on the machine type of individual task processing device in the cooperative job flow.

Accordingly, the exemplary embodiments of the present invention can easily create a machine type dependent job flow commonly usable among different machine types of task processing devices.

Furthermore, the exemplary embodiments of the present invention enable different task processing devices to use a common cooperative job flow, so that the functions of individual task processing devices can be effectively used.

Furthermore, the exemplary embodiments of the present invention enable each task processing device to use an optional function, if added, without modifying the job flow.

Furthermore, it is not required to prepare a job flow dedicated to each device.

Moreover, the exemplary embodiments of the present invention can realize a flexible cooperative job flow execution environment in which a complicated work for changing all or most of the job flows is not required even when an optional function is added to the task processing device.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2005-298478 filed Oct. 13, 2005 and Japanese Patent Application No. 2006-137528 filed May 17, 2006, which are hereby incorporated by reference herein in their entirety.

The invention claimed is:

1. An information processing apparatus configured to create definition information of a task cooperative job flow including plural tasks executable as a series of cooperated job processing and usable in plural machine types of task processing devices including first and second task processing devices mutually different in machine type, the information processing apparatus comprising:
a display unit configured to display first task information relating to plural tasks usable in the first task processing device, in creating definition information of a first task cooperative job flow executable in the first task processing device;
an editing creation unit configured to create definition information of the first task cooperative job flow based on an edit instruction entered using the first task information displayed by the display unit; and
a production unit configured to produce definition information of a second task cooperative job flow executable in the second task processing device based on the definition information of the first cooperative job flow created by the editing creation unit as well as based on second task information relating to plural tasks usable in the second task processing device.

2. The information processing apparatus according to claim 1, wherein the definition information of the second task cooperative job flow produced by the production unit is definition information of a task cooperative job flow having machine type dependence and commonly usable between the first task processing device and the second task processing device.

3. The information processing apparatus according to claim 1, wherein the display unit displays the first task information classified into common information applied to all machine types and individual information dependent on the machine type.

4. The information processing apparatus according to claim 1, further comprising an obtaining unit configured to obtain information relating to the tasks usable in the plural machine types of task processing devices via a network from the plural machine types of task processing devices.

5. The information processing apparatus according to claim 1, wherein when the definition information of the first cooperative job flow includes first individual task information not involved in the second task information, the production unit produces the definition information of the second task cooperative job flow by deleting the first individual task information from the definition information of the first cooperative job flow.

6. The information processing apparatus according to claim 1, wherein when the second task information includes second individual task information not involved in the first task information, the production unit asks if each item of the second individual task information should be used in the production of the definition information of the second task cooperative job flow, and
wherein the production unit incorporates each instructed item of the second individual task information into the definition information of the first task cooperative job flow to produce the definition information of the second task cooperative job flow.

7. The information processing apparatus according to claim 1, further comprising a setting unit configured to determine whether individual tasks usable in the plural machine types of task processing devices should be used in the definition information of the task cooperative job flow produced from the production unit, wherein when the second task information includes second individual task information not involved in the first task information, the production unit incorporates the second individual task information, which is set to use by the setting unit, into the definition information of the first task cooperative job flow to produce the definition information of the second task cooperative job flow.

8. The information processing apparatus according to claim 1, wherein the display unit displays third task information relating to tasks usable among all machine types of task processing devices in creating definition information of a third task cooperative job flow having machine type dependence and commonly usable among all machine types of task processing devices, and wherein the editing creation unit creates the definition information of the third task cooperative job flow based on an edit instruction entered using the third task information displayed by the display unit.

9. A cooperative task processing system comprising plural machine types of task processing devices, a management server, and a client apparatus which can communicate with each other via a network, wherein the client apparatus comprises:

a display unit configured to display first task information relating to plural tasks usable in a first task processing device, in creating definition information of a first task cooperative job flow executable in the first task processing device corresponding to one of the plural machine types of task processing devices;

an editing creation unit configured to create definition information of the first task cooperative job flow based on an edit instruction entered using the first task information displayed by the display unit;

a production unit configured to produce definition information of a second task cooperative job flow executable in a second task processing device based on the definition information of the first cooperative job flow created by the editing creation unit as well as based on second task information relating to plural tasks usable in the second task processing device different in machine type from the first task processing device; and a first transmission unit configured to transmit the definition information of the task cooperative job flow produced by the production unit to the management server, wherein the management server comprises:

a registration unit configured to store the definition information of the task cooperative job flow transmitted from the client apparatus in a storage unit; and a second transmission unit configured to transmit the definition information of the task cooperative job flow registered in the storage unit to any one of the task processing devices in accordance with a request from the one of the task processing devices, and wherein each of the plural task processing devices comprises an execution unit configured to obtain the definition information of the task cooperative job flow from the management server and execute the definition information of the task cooperative job flow.

10. A task cooperative job flow creation method for creating definition information of a task cooperative job flow including plural tasks executable as a series of cooperated job processing and usable in plural machine types of task processing devices including first and second task processing devices mutually different in machine type, comprising:

a display step of displaying first task information relating to plural tasks usable in the first task processing device, in creating definition information of a first task cooperative job flow executable in the first task processing device;

an editing creation step of creating definition information of the first task cooperative job flow based on an edit instruction entered using the displayed first task information; and a production step of producing definition information of a second task cooperative job flow executable in the second task processing device based on the definition information of the created first cooperative job flow as well as based on second task information relating to plural tasks usable in the second task processing device.

11. A task cooperative job flow execution method for creating definition information of a task cooperative job flow including plural tasks executable as a series of cooperated job processing and usable in a cooperative task processing system including plural machine types of task processing devices, a management server, and a client apparatus which can communicate with each other via a network, wherein the client apparatus performs:

a display step of displaying first task information relating to plural tasks usable in a first task processing device, in creating definition information of a first task cooperative job flow executable in the first task processing device corresponding to one of the plural machine types of task processing devices;

an editing creation step of creating definition information of the first task cooperative job flow based on an edit instruction entered using the displayed first task information;

a production step of producing definition information of a second task cooperative job flow executable in a second task processing device based on the created definition information of the first cooperative job flow as well as based on second task information relating to plural tasks usable in the second task processing device different in machine type from the first task processing device; and a first transmission step of transmitting the produced definition information of the task cooperative job flow to the management server, wherein the management server performs:

a registration step of storing the definition information of the task cooperative job flow transmitted from the client apparatus in a storage unit; and a second transmission step of transmitting the definition information of the task cooperative job flow registered in the storage unit to any one of the task processing devices in accordance with a request from the one of the task processing devices, and wherein each of the plural task processing devices performs an execution step of obtaining the definition information of the task cooperative job flow from the management server and executing the definition information of the task cooperative job flow.

12. A non-transitory computer-readable storage medium storing computer-executable program for creating definition information of a task cooperative job flow including plural tasks executable as a series of cooperated job processing and usable in plural machine types of task processing devices including first and second task processing devices mutually different in machine type, the program comprising:

computer-executable instructions for displaying first task information relating to plural tasks usable in the first task processing device, in creating definition information of a first task cooperative job flow executable in the first task processing device;

computer-executable instructions for creating definition information of the first task cooperative job flow based on an edit instruction entered using the displayed first task information; and computer-executable instructions for producing definition information of a second task cooperative job flow executable in the second task processing device based on the definition information of the created first cooperative job flow as well as based on second task information relating to plural tasks usable in the second task processing device.

* * * * *